US011019243B2

(12) United States Patent
Agawa et al.

(10) Patent No.: US 11,019,243 B2
(45) Date of Patent: May 25, 2021

(54) CAMERA UNIT AND MOBILE BODY

(71) Applicant: SONY SEMICONDUCTOR SOLUTIONS CORPORATION, Kanagawa (JP)

(72) Inventors: Tomonori Agawa, Kanagawa (JP); Eiji Oba, Tokyo (JP); Hiroo Suzuki, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/616,208

(22) PCT Filed: May 16, 2018

(86) PCT No.: PCT/JP2018/018841
§ 371 (c)(1),
(2) Date: Nov. 22, 2019

(87) PCT Pub. No.: WO2018/221210
PCT Pub. Date: Dec. 6, 2018

(65) Prior Publication Data
US 2020/0195822 A1    Jun. 18, 2020

(30) Foreign Application Priority Data

May 30, 2017    (JP) .............................. JP2017-106646

(51) Int. Cl.
*H04N 5/225*    (2006.01)
*G02B 7/02*    (2021.01)

(52) U.S. Cl.
CPC ........... *H04N 5/2257* (2013.01); *G02B 7/025* (2013.01); *H04N 5/2254* (2013.01)

(58) Field of Classification Search
None
See application file for complete search history.

(56) References Cited

U.S. PATENT DOCUMENTS 8,442,593 B1 *    5/2013    Kwon ................. H04M 1/0266
455/566
2009/0244728 A1    10/2009    Tamoyama et al.
(Continued)

FOREIGN PATENT DOCUMENTS

CN    202522828 U    11/2012
EP    2651115 A2    10/2013
(Continued)

OTHER PUBLICATIONS

International Search Report and Written Opinion of PCT Application No. PCT/JP2018/018841, dated Aug. 7, 2018, 09 pages of ISRWO.

*Primary Examiner* — Talha M Nawaz
(74) *Attorney, Agent, or Firm* — Chip Law Group

(57) ABSTRACT

The present technology relates to a camera unit and a mobile body capable of improving Electromagnetic Compatibility (EMC) performance. The camera unit includes a shield arranged at least on a side of one side surface of a sensor substrate to which an image sensor is attached and a contact portion that has conductivity and is provided on the sensor substrate so as to have contact with a portion on a side of a side surface of the sensor substrate of the shield. The present technology is applied to, for example, a camera unit or the like mounted on a mobile body such as a vehicle.

7 Claims, 37 Drawing Sheets

(56) References Cited

U.S. PATENT DOCUMENTS

| | | | |
|---|---|---|---|
| 2011/0076434 A1* | 3/2011 | Cho | ............................ C09J 5/06 |
| | | | 428/38 |
| 2013/0150122 A1* | 6/2013 | Kulas | .................. H04M 1/0264 |
| | | | 455/556.1 |
| 2013/0265427 A1 | 10/2013 | Lin et al. | |
| 2014/0128131 A1* | 5/2014 | Sin | ...................... H04B 1/3888 |
| | | | 455/575.8 |
| 2016/0254835 A1* | 9/2016 | Ashley | ................. H04B 1/3888 |
| | | | 455/575.8 |
| 2016/0330361 A1* | 11/2016 | Kulas | ................. H04N 5/23203 |

FOREIGN PATENT DOCUMENTS

| | | |
|---|---|---|
| JP | 2005-229431 A | 8/2005 |
| JP | 2008-060163 A | 3/2008 |
| JP | 2009-200987 A | 9/2009 |
| JP | 2009-253363 A | 10/2009 |
| JP | 2010-109550 A | 5/2010 |
| JP | 3178274 U | 9/2012 |
| JP | 2013-109188 A | 6/2013 |
| JP | 2016-130746 A | 7/2016 |
| TW | M433994 U | 7/2012 |
| WO | 2014/178260 A1 | 11/2014 |

\* cited by examiner

FIG. 17
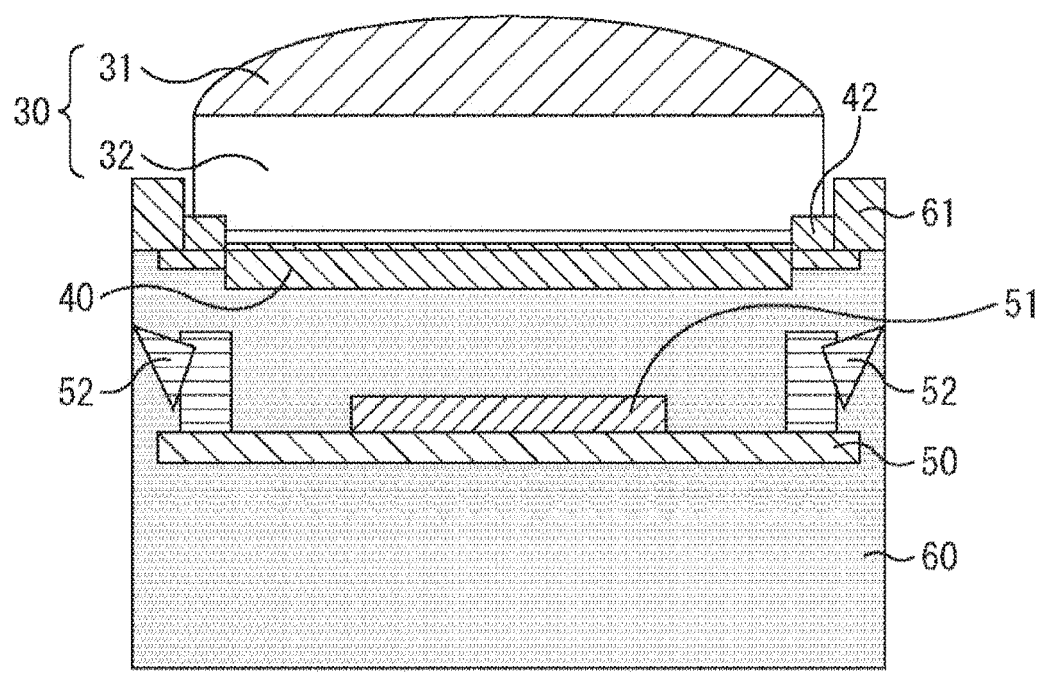
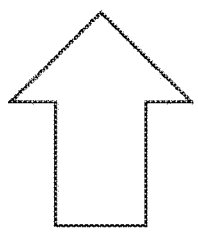
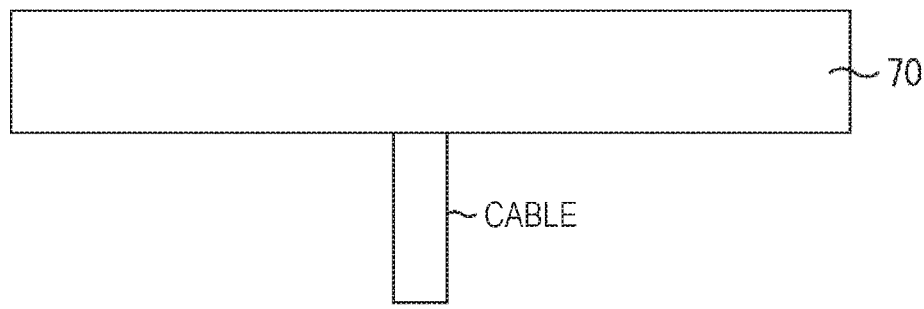

CAMERA UNIT AND MOBILE BODY

CROSS REFERENCE TO RELATED APPLICATIONS

This application is a U.S. National Phase of International Patent Application No. PCT/JP2018/018841 filed on May 16, 2018, which claims priority benefit of Japanese Patent Application No. JP 2017-106646 filed in the Japan Patent Office on May 30, 2017. Each of the above-referenced applications is hereby incorporated herein by reference in its entirety.

TECHNICAL FIELD

The present technology relates to a camera unit and a mobile body, and particularly, for example, to a camera unit and a mobile body that can improve Electromagnetic Compatibility (EMC) performance.

BACKGROUND ART

For example, for a so-called on-vehicle camera mounted on a vehicle, a unique strict Electromagnetic Compatibility (EMC) standard is specified for each vehicle manufacturer, and measures for the EMC are required.

In unnecessary radiation of a small camera unit used as an on-vehicle camera or the like, (unnecessary) radiation noise generated from an image sensor (Integrated Circuit (IC) as image sensor) included in the camera unit accounts for a large percentage.

Therefore, to improve the EMC performance, in the camera unit, it is necessary to secure a path through which the radiation noise of the image sensor returns to the image sensor and further shorten a loop as the return path.

As a method of shortening the loop as the return path, there is a method of realizing the conduction between the lens unit and the sensor substrate via the screws in a short distance by fixing the lens unit included in the camera unit to the sensor substrate on which the image sensor is mounted by metal screws (pin) (screw) having conductivity (for example, refer to Patent Document 1).

CITATION LIST

Patent Document

Patent Document 1: Japanese Patent Application Laid-Open No. 2009-200987

SUMMARY OF THE INVENTION

Problems to be Solved by the Invention

In a case where a lens unit is fixed to a sensor substrate with screws, screw holes are made in the lens unit and the sensor substrate, and the screw passes through the screw hole. Therefore, a positional relationship between the lens unit and the sensor substrate is determined by the screw holes opened in the lens unit and the sensor substrate.

Therefore, for example, in a case where an optical axis of the lens unit (lens thereof) is shifted due to manufacturing variation and the like, it is difficult to adjust the positional relationship between the lens unit and the sensor substrate according to the shift.

As a method of enabling to the positional relationship between the lens unit and the sensor substrate, there is a method of fixing the lens unit to the sensor substrate with adhesive. However, with the adhesive, it is difficult to realize conduction between the lens unit and the sensor substrate in a short time as in a case where the screws are used.

As a result, the loop as the return path through which the radiation noise of the image sensor returns to the image sensor is lengthened, and it is difficult to improve the EMC performance.

The present technology has been made in consideration of such a situation and can improve EMC performance.

Solutions to Problems

The camera unit according to the present technology includes a shield arranged at least on a side of one side surface of a sensor substrate to which an image sensor is attached and a contact portion that has conductivity and is provided on the sensor substrate so as to have contact with a portion on a side of a side surface of the sensor substrate of the shield.

A mobile body according to the present technology includes a driving system control unit that controls driving of the mobile body and a camera unit, in which the camera unit includes: a shield arranged at least on a side of one side surface of a sensor substrate to which an image sensor is attached; and a contact portion that has conductivity and is provided on the sensor substrate so as to have contact with a portion on a side of a side surface of the sensor substrate of the shield.

In the camera unit and the mobile body according to the present technology, the shield is arranged at least on a side of one side surface of the sensor substrate to which the image sensor is attached, and the contact portion having conductivity is provided on the sensor substrate so as to have a portion on the side of the side surface of the sensor substrate of the shield.

Note that, the camera unit may be an independent device and may be an internal block forming a single device.

Effects of the Invention

According to the present technology, an EMC performance can be improved.

Note that the effects described herein are not necessarily limited and that the effect may be any effects described in the present disclosure.

BRIEF DESCRIPTION OF DRAWINGS

FIG. 17 is a front view for explaining the method of manufacturing the second exemplary configuration of the camera unit 10.

MODE FOR CARRYING OUT THE INVENTION

<One Embodiment of Camera Unit to which Present Technology is Applied>

Figure 1:
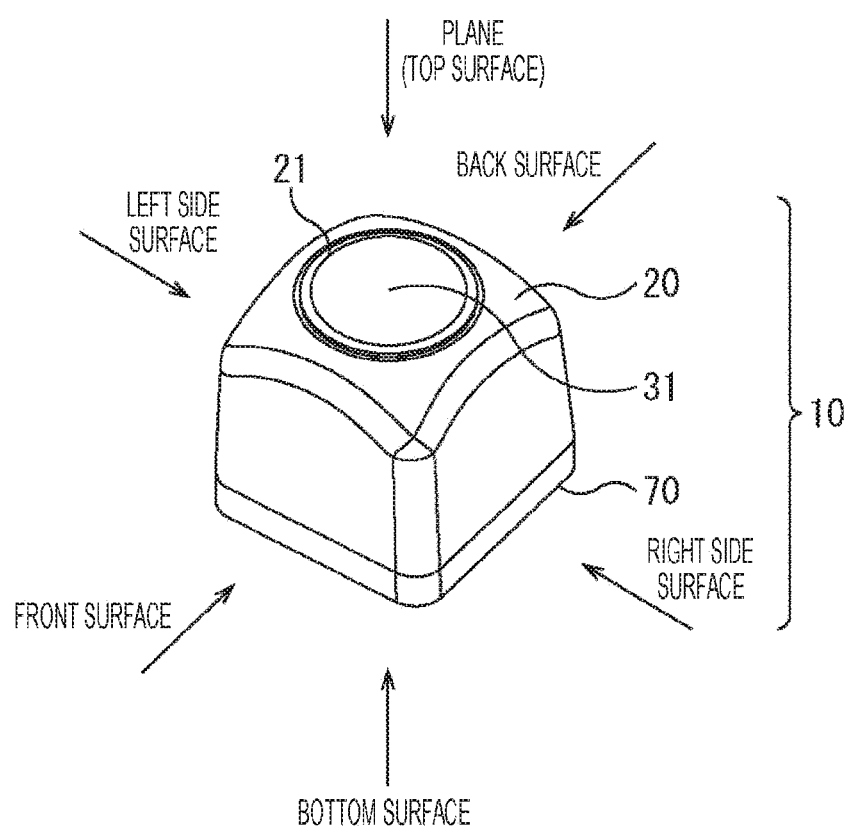
FIG. 1 is a perspective view of an exemplary appearance configuration of one embodiment of a camera unit to which the present technology is applied.

FIG. 1 is a perspective view of an exemplary appearance configuration of one embodiment of a camera unit to which the present technology is applied.

In FIG. 1, a camera unit 10 has a substantially rectangular parallelepiped shape and is formed by attaching a harness connector 70 to a cover 20.

An opening 21 is provided in the cover 20, and a lens 31 that collects light is exposed from the opening 21.

In the camera unit 10, an image is captured by receiving the light collected by the lens 31.

Here, a surface of the substantially rectangular parallelepiped camera unit 10 where the lens 31 is exposed is assumed as a top surface (plane), and a surface on the front side in the perspective view in FIG. 1 is assumed as the front surface. Accordingly, other four surfaces, including the left side surface, the right side surface, the back surface, and the bottom surface are defined.

Figure 2:
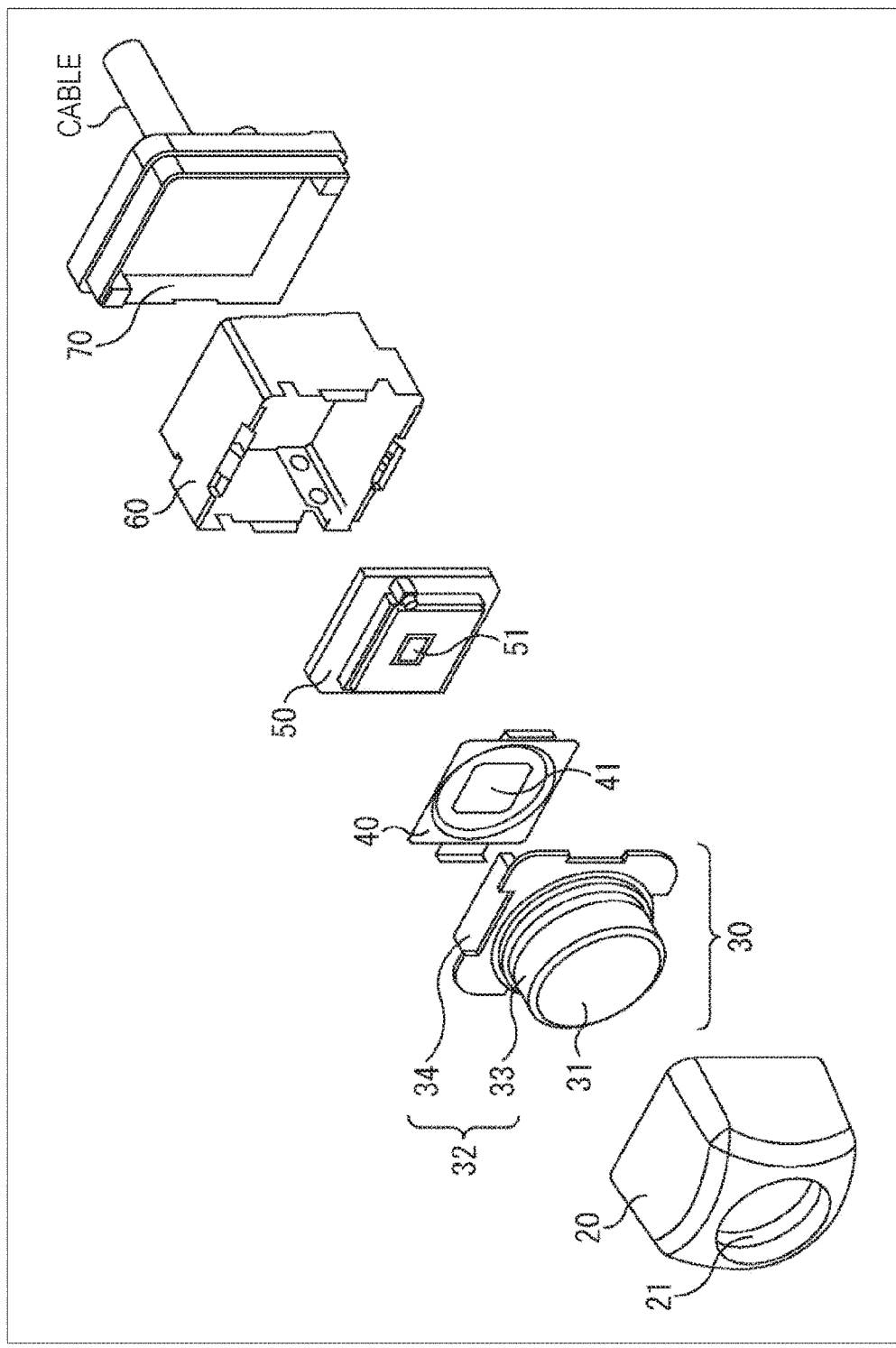
FIG. 2 is an exploded view of an exemplary configuration of a camera unit 10.

FIG. 2 is an exploded view of an exemplary configuration of the camera unit 10 in FIG. 1.

The camera unit 10 includes the cover 20, a lens unit 30, a lens shield 40, a sensor substrate 50, a camera shield 60, and the harness connector 70 and is assembled from the cover 20 to the harness connector 70.

The cover 20 has a substantially rectangular parallelepiped shape. The opening 21 from which the lens 31 is exposed is provided through the top surface of the cover 20, and the bottom surface on the opposite side is opened so as to house the lens unit 30 and the like.

The lens unit 30 includes the lens 31 and a lens holder 32 and is configured by attaching the lens 31 to the lens holder 32. The lens holder 32 includes a lens barrel 33 and legs 34. The lens barrel 33 supports the lens 31, and the leg 34 is fixed to the sensor substrate 50 with adhesive.

The lens shield 40 is formed, for example, by providing an opening 41 through which the light from the lens 31 passes toward an image sensor 51 of the sensor substrate 50 in a substantially rectangular conductive metal plate. The lens shield 40 is attached to the lens holder 32 and prevents radiation noise of the image sensor 51 of the sensor substrate 50 from being radiated toward the top surface.

A chip (IC) which is the image sensor 51 is attached to the sensor substrate 50. The image sensor 51 is, for example, a Complemental Metal Oxide Semiconductor (CMOS) image sensor, and receives and photoelectrically converts light entered from the lens 31 of the lens unit 30 through the opening 41 of the lens shield 40 so as to capture an image.

Note that, as the image sensor 51, an image sensor that receives visible light, an image sensor that receives light other than visible light, for example, infrared light or the like, and an image sensor that receives both of the visible light and the light other than the visible light can be adopted.

The camera shield 60 is formed by, for example, molding a conductive metal plate into a substantially rectangular parallelepiped shape whose top surface is opened. In the camera unit 10, the camera shield 60 houses the sensor substrate 50 and is arranged so as to surround surfaces around a substrate main surface of the sensor substrate 50 (in sensor substrate 50, surface on which components such as image sensor 51 are arranged), that is, the front surface, the back surface, the left side surface, the right side surface, and the bottom surface. With this structure, the camera shield 60 prevents the radiation noise of the image sensor 51 of the sensor substrate 50 from being radiated around the sensor substrate 50 and to the side of the bottom surface of the sensor substrate 50. As described above, since the camera shield 60 is arranged so as to surround the surfaces around the substrate main surface of the sensor substrate 50, the camera shield 60 is a shield arranged at least on a side of one side surface of the sensor substrate 50.

The harness connector 70 can be attached to and detached from a cable that enables electrical connection to the outside. The harness connector 70 is electrically connected to the sensor substrate 50, the camera shield 60, and the like. With this electrical connection, when the harness connector 70 is connected to the cable, the cable is electrically connected to the sensor substrate 50, the camera shield 60, and the like.

The camera unit 10 including the cover 20 to the harness connector 70 described above is assembled, for example, as follows.

That is, the lens shield 40 is fixed to the lens unit 30, and the sensor substrate 50 is further fixed. Moreover, the camera shield 60 is attached so as to house the sensor substrate 50, and the harness connector 70 is attached. Then, finally, the cover 20 is attached so as to house the lens unit 30 to the camera shield 60 and to be fitted with the harness connector 70.

Figure 3:
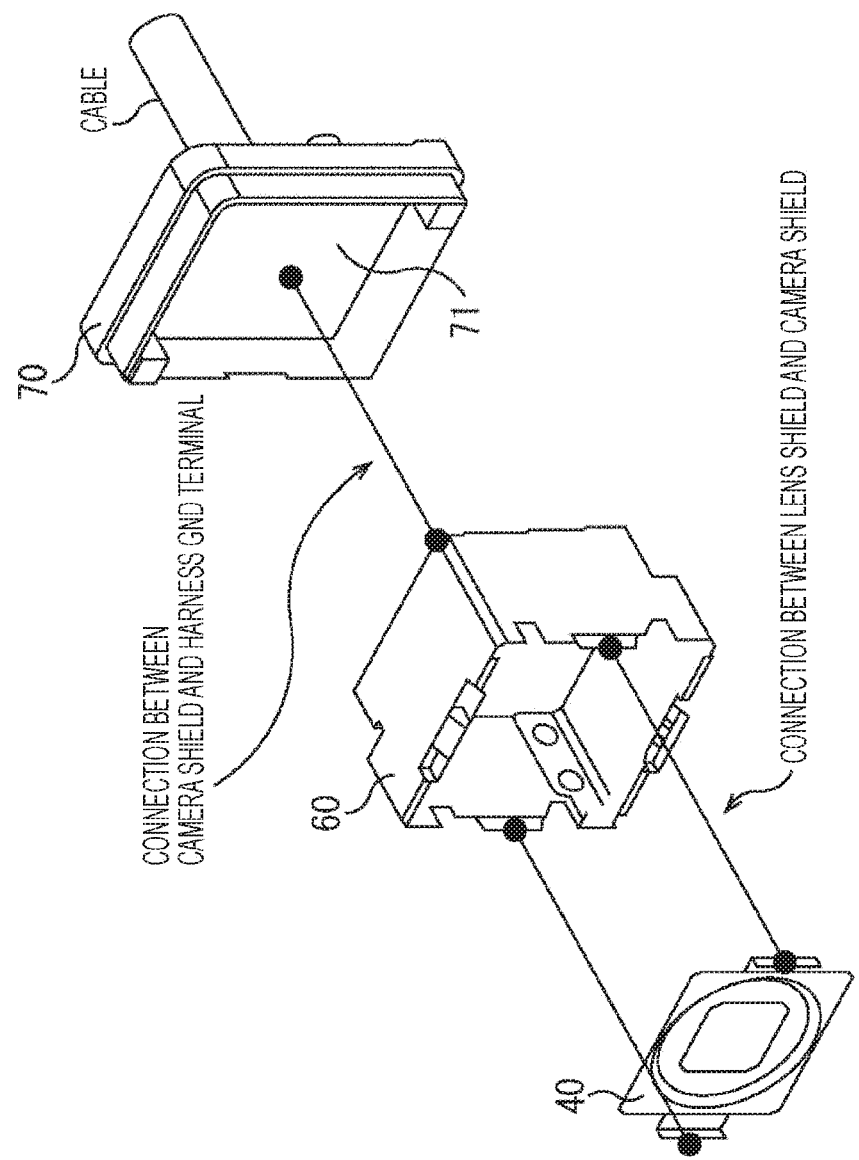
FIG. 3 is a diagram for explaining connection of a lens shield 40 and a camera shield 60 to a GND reference point of a sensor substrate circuit.

FIG. 3 is a diagram for explaining connection of the lens shield 40 and the camera shield 60 to a GND reference point.

The harness connector 70 includes a harness GND terminal 71 that is connected to a GND line connected to an external GND reference point in the cable when the cable is attached.

In the camera unit 10, the lens shield 40 is connected to the camera shield 60, and the camera shield 60 is connected to the harness GND terminal 71. As a result, the lens shield 40 and the camera shield 60 are connected to the GND reference point via the cable attached to the harness connector 70.

Note that, in a case where the camera unit 10 is mounted on a vehicle, for example, as an on-vehicle camera, the GND line of the cable attached to the harness connector 70 is connected to a GND reference point of the vehicle on which the camera unit 10 as the on-vehicle camera is mounted.

<Exemplary Configuration of Lens Unit 30>

Figure 4:
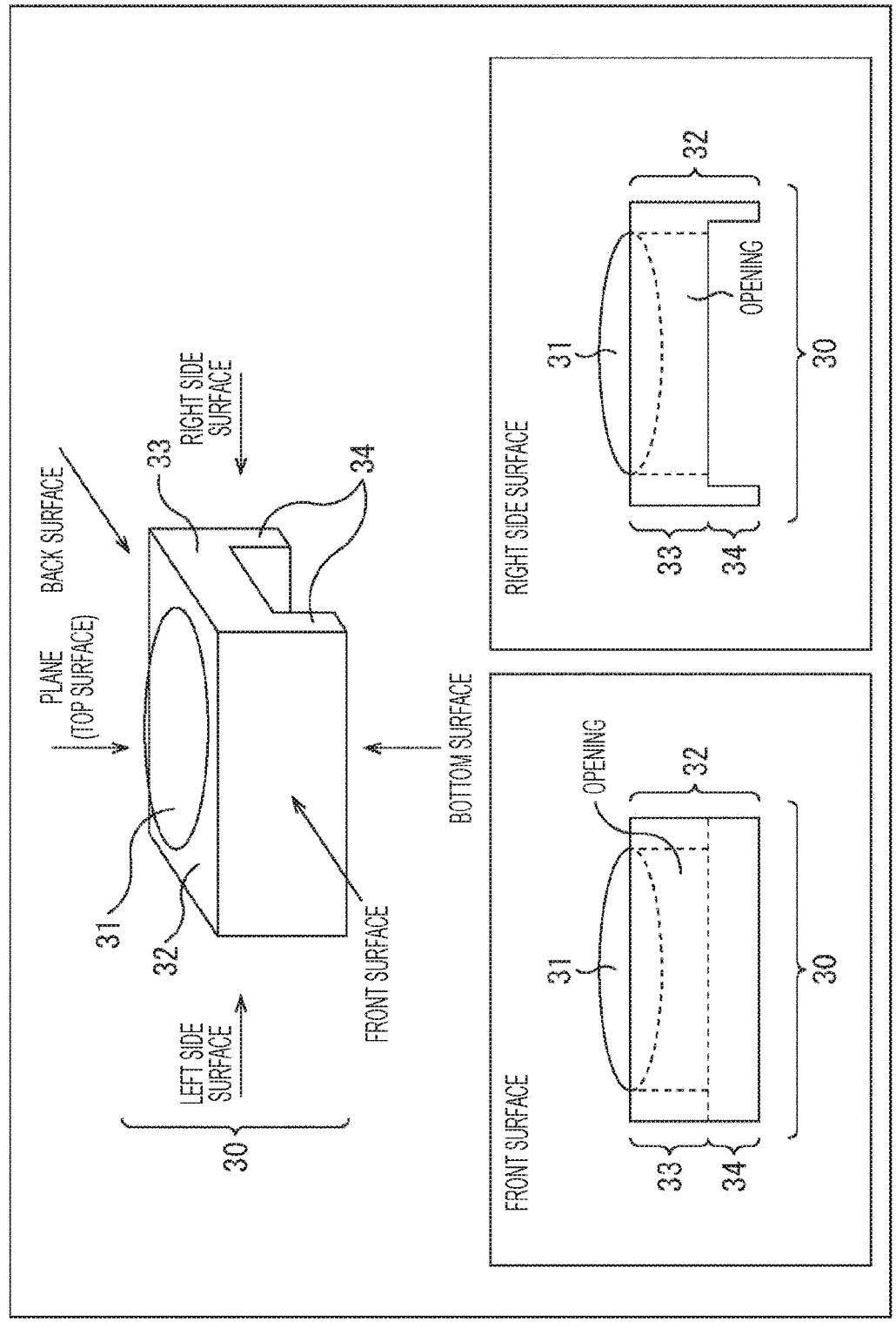
FIG. 4 is a perspective view, a front view, and a right side view of an exemplary configuration (outline) of a lens unit 30.

FIG. 4 is a perspective view, a front view, and a right side view of an exemplary configuration (outline) of the lens unit 30.

The lens unit 30 includes the lens 31 and the lens holder 32, and the lens holder 32 includes the lens barrel 33 and the legs 34.

In the lens holder 32, the lens barrel 33 has a cylindrical opening and supports the lens 31 by fitting the lens 31 into the opening.

In the lens holder 32, the legs 34 are formed as walls extending in the horizontal direction on the side of the front surface and the side of the back surface.

In the lens holder 32, a portion that is provided below the lens barrel 33 (bottom surface side) and is sandwiched by the legs 34 on the sides of the front surface and the back surface is a space.

The light entered the lens 31 is irradiated to the image sensor 51 of the sensor substrate 50 through the opening of the lens barrel 33 and the space below the lens barrel 33.

<First Exemplary Configuration of Camera Unit 10>

Figure 5:
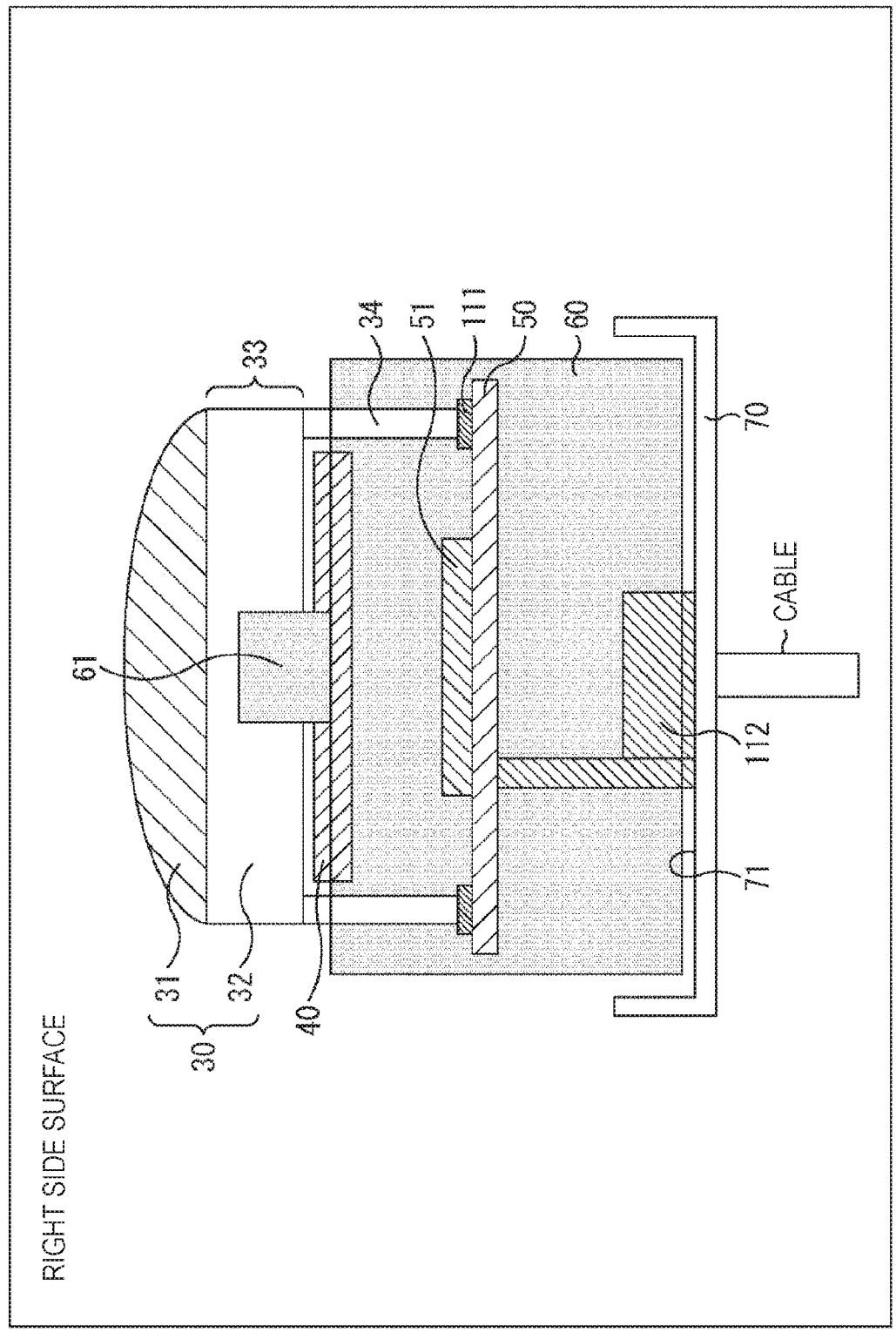
FIG. 5 is a right side view of a first exemplary configuration of the camera unit 10 including the lens shield 40 and the camera shield 60.

FIG. 5 is a right side view of a first exemplary configuration of the camera unit 10 including the lens shield 40 and the camera shield 60.

Note that, in FIG. 5 (similarly in drawings as described later as appropriate), a portion surrounded by the camera shield 60 and a portion of the harness connector 70 are illustrated as the cross-sectional views for easy understanding of the configuration.

In FIG. 5, in the lens unit 30, the lens shield 40 is fixed below the lens barrel 33. Moreover, the leg 34 of the lens unit 30 is adhesively fixed to the sensor substrate 50 by an adhesive material 111, and with this structure, the lens unit 30 is fixed to the sensor substrate 50.

As described above, in the camera unit 10, the lens unit 30 is fixed to the sensor substrate 50 with adhesive. Therefore, a positional relationship between the lens unit 30 and the sensor substrate 50 can be easily adjusted before the adhesive material 111 is dried.

Therefore, in a case where an optical axis of the lens unit (lens 31 configuring lens unit 30) is shifted due to manufacturing variation and the like, the positional relationship between the lens unit 30 and the sensor substrate 50 can be easily adjusted so as to correct the shift.

The camera shield 60 is attached so as to surround the sensor substrate 50 (front surface, back surface, left side surface, and right side surface) and the bottom surface of the sensor substrate 50.

Moreover, the camera shield 60 includes conductive, for example, metal contact portions 61 on the side of the top surface (right side surface and left side surface thereof), and the contact portion 61 is attached so as to electrically connect (have contact with) to the lens shield 40.

Under the sensor substrate 50, a connection portion 112 is provided that electrically connects the cable to the sensor substrate 50 and the like when the cable is connected to the harness connector 70.

Note that, although not illustrated, in the camera unit 10, at least a part of the camera shield 60 on the side of the bottom surface is (electrically) connected to the harness GND terminal 71 of the harness connector 70.

Figure 6:
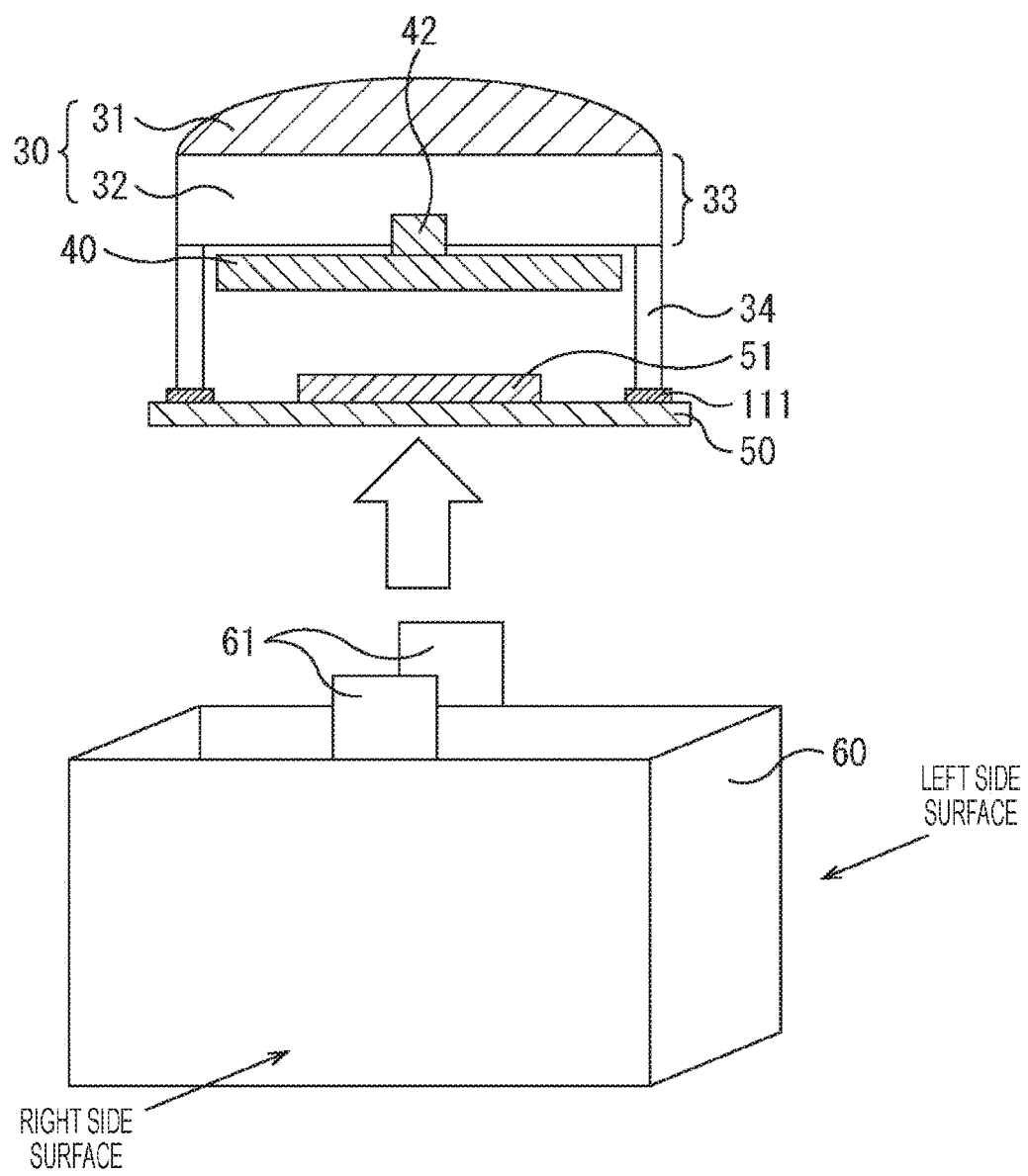
FIG. 6 is a right side view for explaining a method of manufacturing the first exemplary configuration of the camera unit 10.
Figure 7:
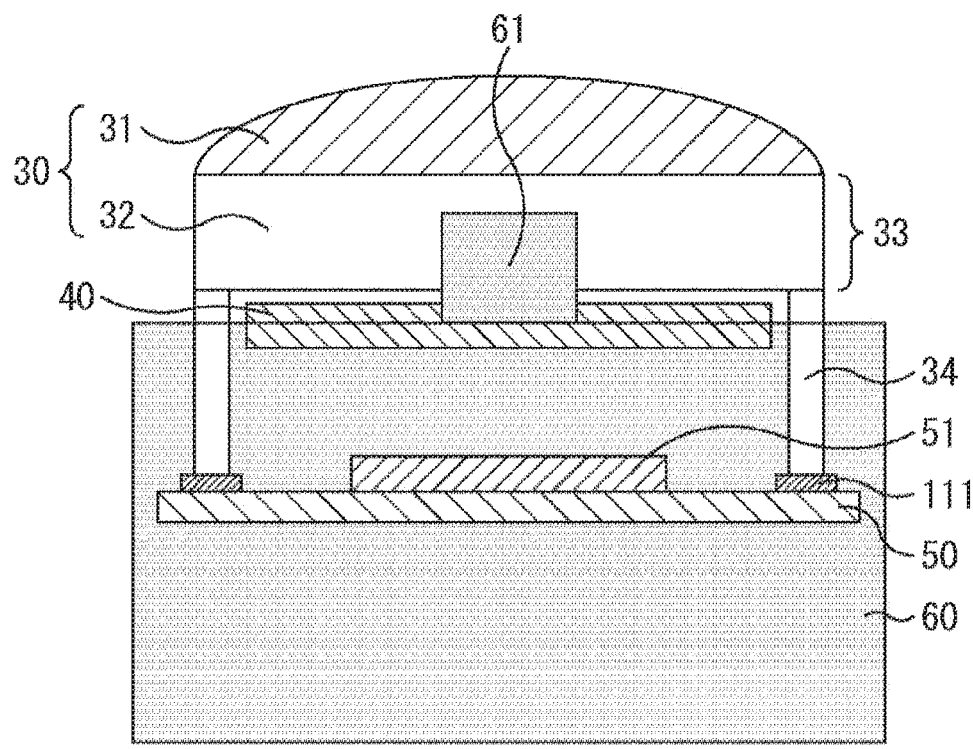
FIG. 7 is a right side view for explaining the method of manufacturing the first exemplary configuration of the camera unit 10.

FIGS. 6 and 7 are right side views for explaining a method of manufacturing (assembling) the first exemplary configuration of the camera unit 10 in FIG. 5.

First, as illustrated in FIG. 6, the lens shield 40 is fixed to the lens unit 30. In other words, the lens shield 40 includes conductive, for example, metal fixing portions 42 on the side of the top surface (right side surface and left side surface thereof), and the lens shield 40 is fixed to the lens unit 30 by fitting the fixing portions 42 into the lower portion (bottom surface side) of the lens barrel 33.

Moreover, the adhesive material 111 is applied to one or both of the leg 34 of the lens unit 30 and the sensor substrate 50, and the lens unit 30 is bonded to the sensor substrate 50.

Before the lens unit 30 is completely bonded to the sensor substrate 50, the positional relationship between the lens unit 30 and the sensor substrate 50 is adjusted.

Then, after the positional relationship between the lens unit 30 and the sensor substrate 50 is adjusted, the lens unit 30 is completely bonded to the sensor substrate 50. Then, as illustrated in FIG. 7, the camera shield 60 is attached.

The camera shield 60 is attached so that the contact portion 61 of the camera shield 60 has contact with the fixing portion 42 (FIG. 6) of the lens shield 40 fixed to the lens unit 30. In FIG. 7, the fixing portion 42 of the lens shield 40 is hidden by the contact portion 61 of the camera shield 60 and cannot be seen.

Thereafter, the harness connector 70 is attached, and the cover 20 is further attached although not illustrated. Accordingly, the camera unit 10 is completed.

Figure 8:
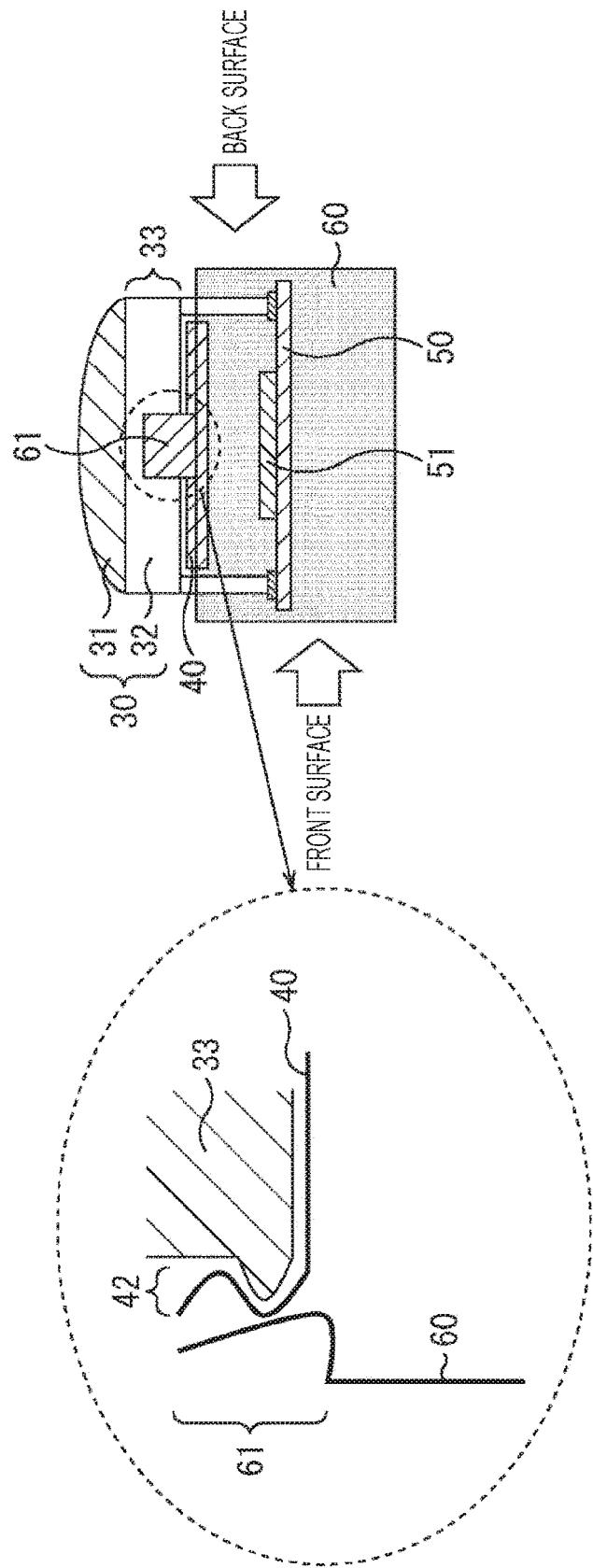
FIG. 8 is a diagram of an example of a detailed configuration of a fixing portion 42 and a contact portion 61 of the camera unit 10.

FIG. 8 is a diagram of an example of a detailed configuration of the fixing portion 42 and the contact portion 61 of the camera unit 10.

In other words, FIG. 8 is a cross-sectional view of the portion of the fixing portion 42 and the contact portion 61 as viewed from the back side.

A lower portion of the lens barrel 33 of the lens holder 32 has a convex shape, and the cross section of the fixing portion 42 of the lens shield 40 has an uneven shape as illustrated in FIG. 8. The lens shield 40 is fixed to the lens unit 30 by fitting the convex portion of the lens barrel 33 into the convex portion of the fixing portion 42.

A cross section of the contact portion 61 of the camera shield 60 is curved inward of the camera shield 60, and then, curved outward.

By pushing the lens unit 30 to which the lens shield 40 is attached into the camera shield 60 so as to attach the lens unit 30 to the camera shield 60, the contact portion 61 of the camera shield 60 biases the fixing portion 42 to the inner side of the camera shield 60 and has firmly contact with (adhere) the fixing portion 42. With this structure, the lens shield 40 is electrically connected to the camera shield 60 via the fixing portions 42 and the contact portions 61.

Figure 9:
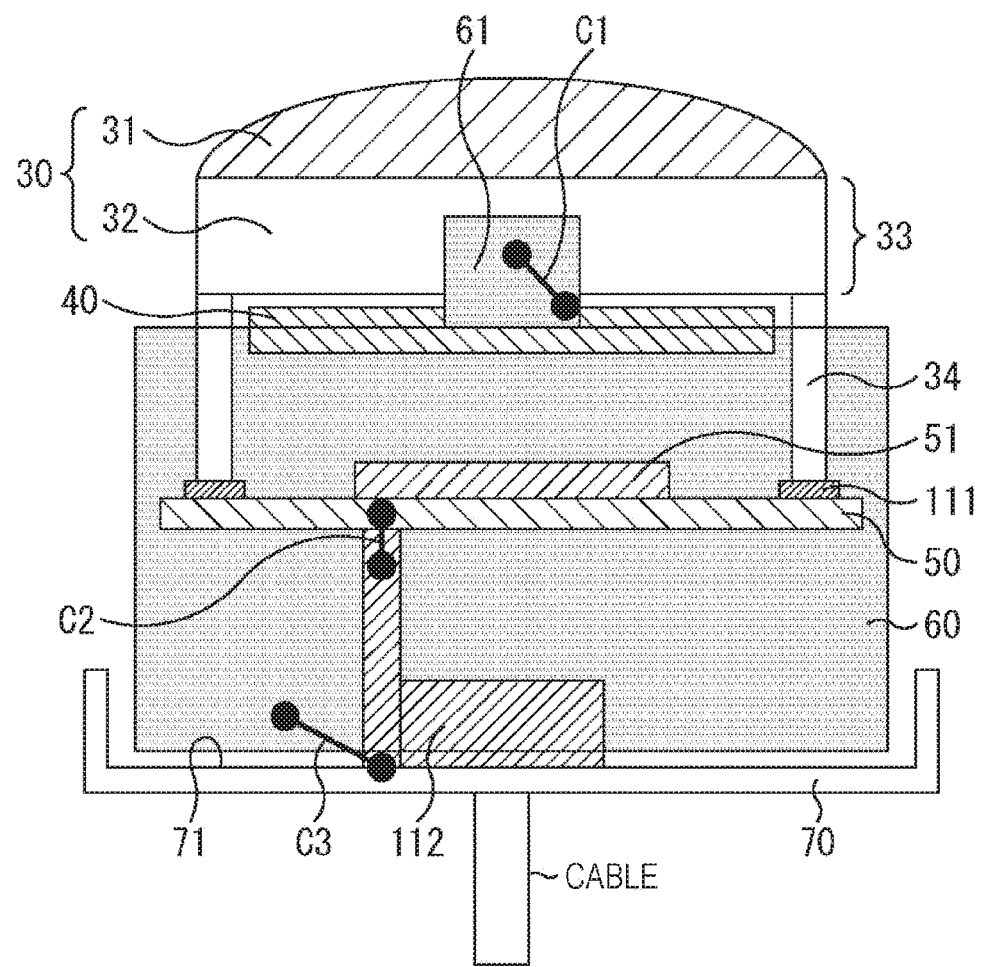
FIG. 9 is a right side view for explaining connection of the lens shield 40, a sensor substrate 50, and the camera shield 60 to the GND reference point in the first exemplary configuration of the camera unit 10.

FIG. 9 is a right side view for explaining connection of the lens shield 40, the sensor substrate 50, and the camera shield 60 to the GND reference point in the first exemplary configuration of the camera unit 10 in FIG. 5.

The lens shield 40 is electrically connected to the camera shield 60 via a contact part C1 between the fixing portion 42 (FIG. 6) of the lens shield 40 and the contact portion 61 of the camera shield 60.

The sensor substrate 50 is connected to the harness GND terminal 71 connected to a GND reference point of a vehicle via a contact part C2 between the sensor substrate 50 and the connection portion 112 and the connection portion 112.

The camera shield 60 is connected to the harness GND terminal 71 connected to the GND reference point of the vehicle via a contact part C3 between the camera shield 60 and the harness GND terminal 71.

Therefore, the lens shield 40, the sensor substrate 50 (GND reference point thereof, and GND (reference point) of image sensor 51), and the camera shield 60 are connected to the same GND reference point.

In the camera unit 10, the top surface of the image sensor 51 is covered with the lens shield 40 connected to the GND reference point, and the camera shield 60 connected to the GND reference point covers the surfaces around (front surface, back surface, left side surface, and right side surface) the image sensor 51 and the bottom surface of the image sensor 51. It is possible to prevent the radiation of the radiation noise of the image sensor 51 to the outside of the camera unit 10.

Figure 10:
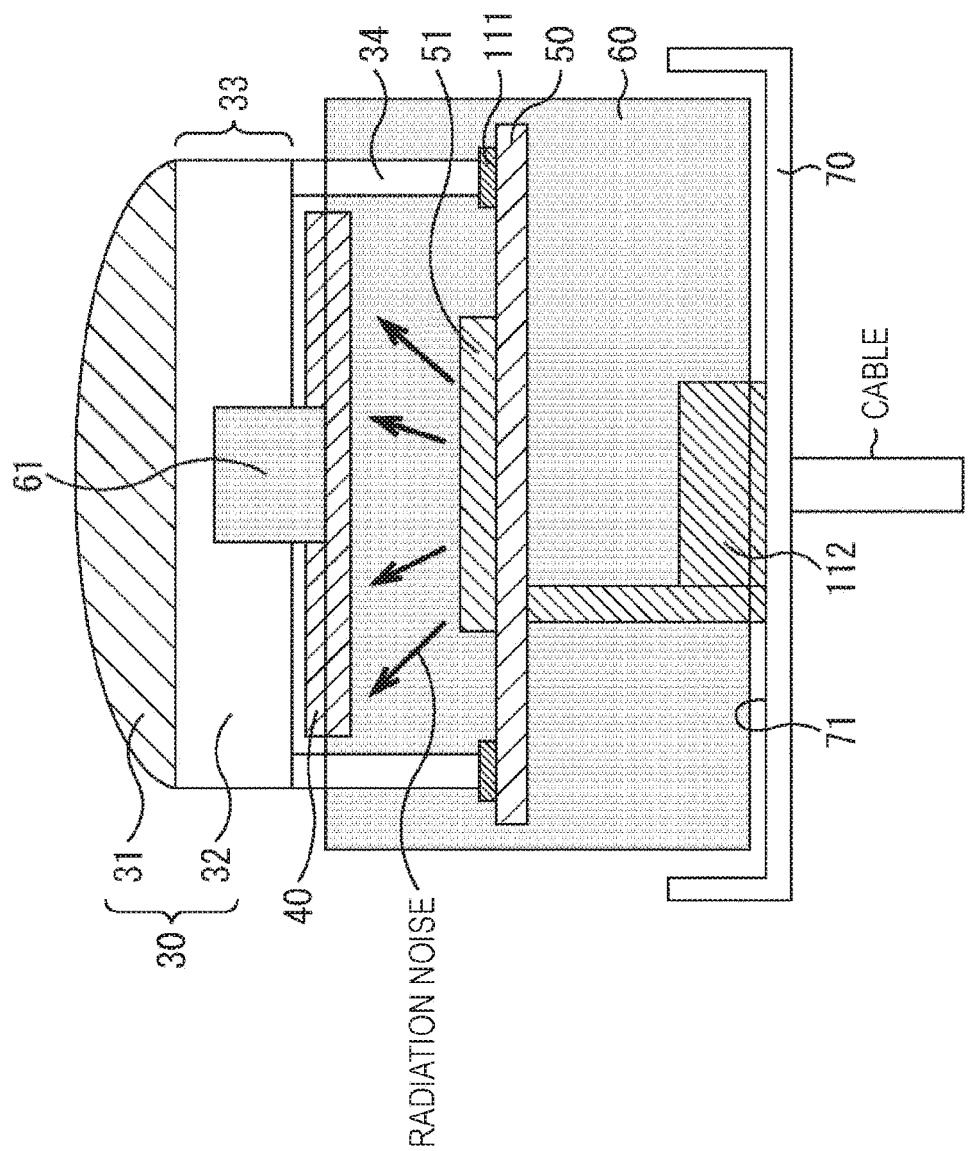
FIG. 10 is a right side view for explaining propagation of radiation noise of an image sensor 51 in the first exemplary configuration of the camera unit 10.
Figure 11:
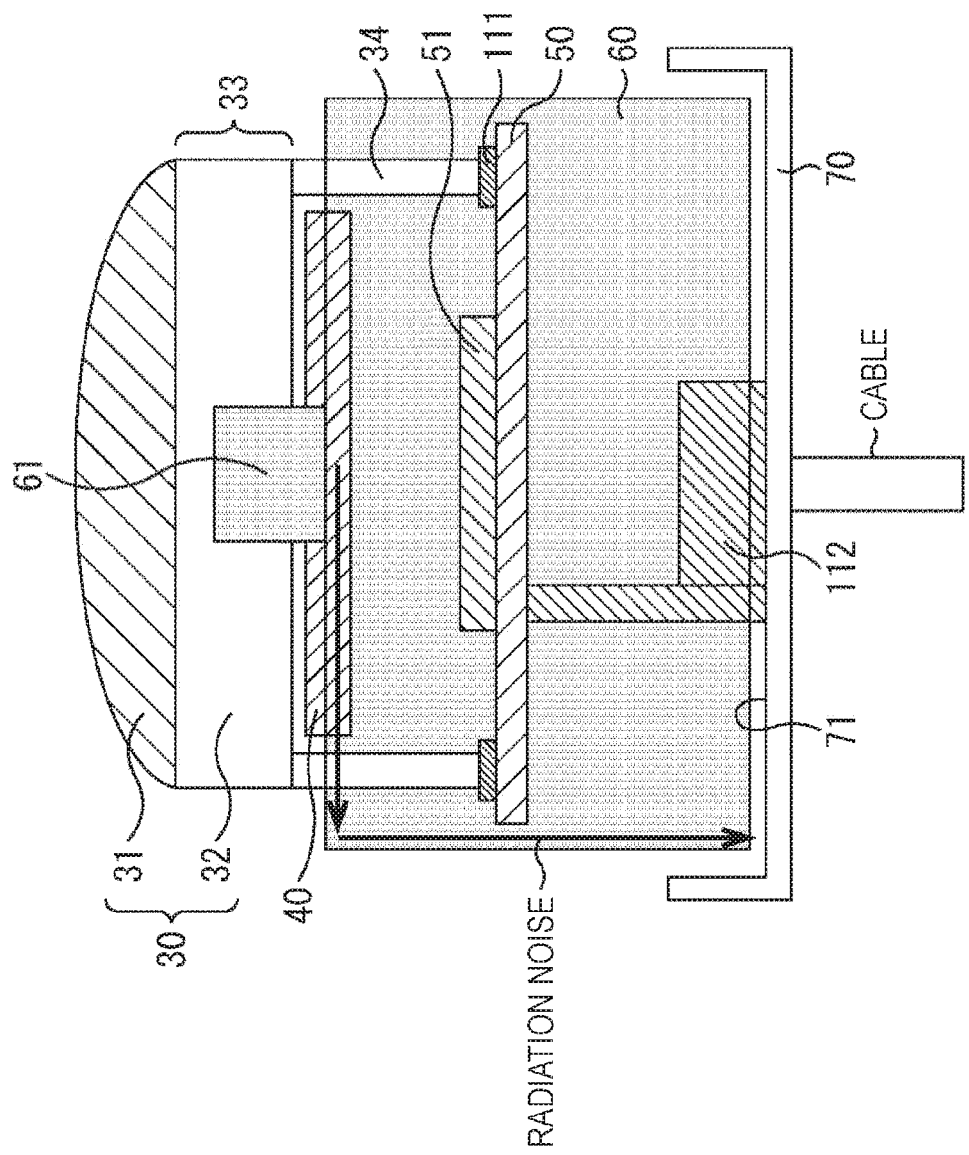
FIG. 11 is a right side view for explaining the propagation of the radiation noise of the image sensor 51 in the first exemplary configuration of the camera unit 10.
Figure 12:
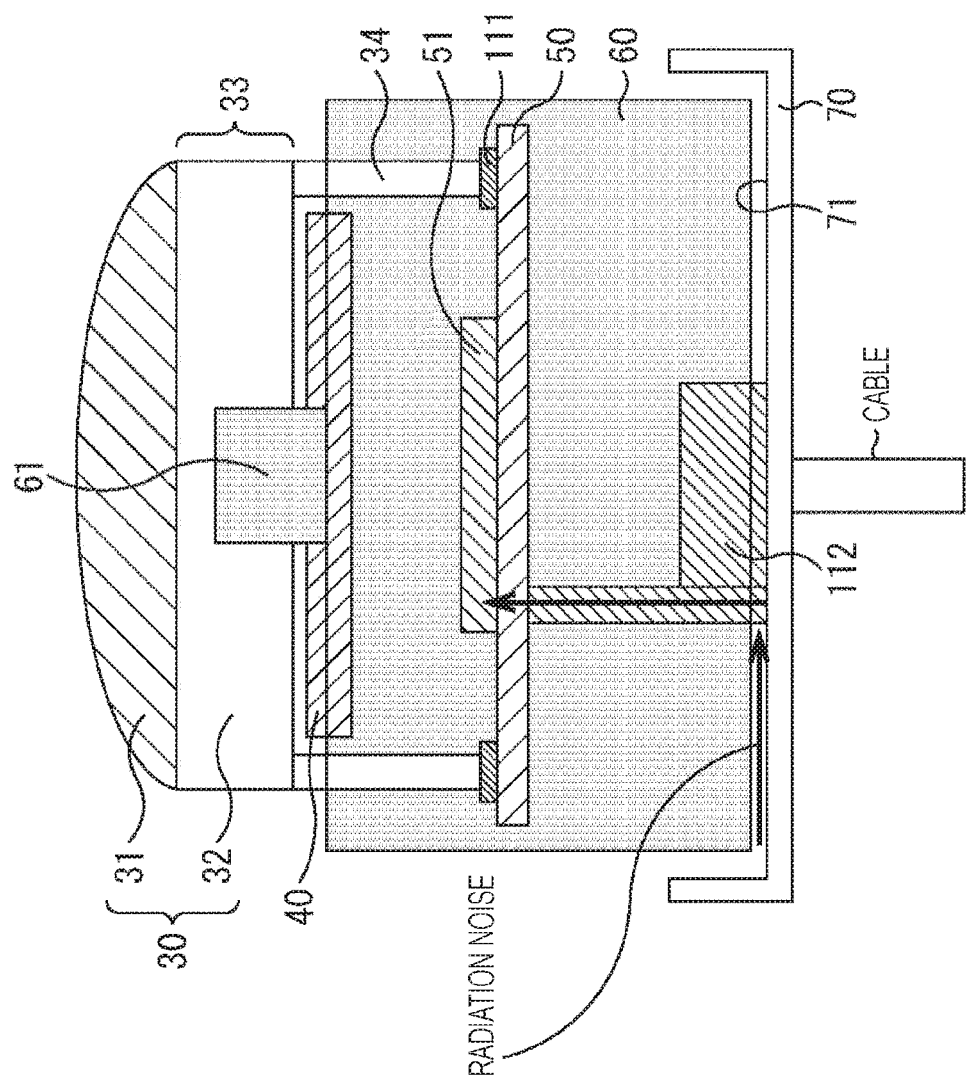
FIG. 12 is a right side view for explaining the propagation of the radiation noise of the image sensor 51 in the first exemplary configuration of the camera unit 10.

FIGS. 10, 11, and 12 are right side views for explaining propagation of the radiation noise of the image sensor 51 in the first exemplary configuration of the camera unit 10 in FIG. 5.

The radiation noise of the image sensor 51 propagates to the lens shield 40 as illustrated in FIG. 10. Moreover, as illustrated in FIG. 11, the radiation noise of the image sensor 51 propagates from the lens shield 40 along the camera shield 60 connected to the lens shield 40 from the upper side to the lower side. Then, as illustrated in FIG. 12, the radiation noise propagates from the camera shield 60 to the connection portion 112 and returns to the sensor substrate 50 and the image sensor 51 of the sensor substrate 50.

Figure 13:
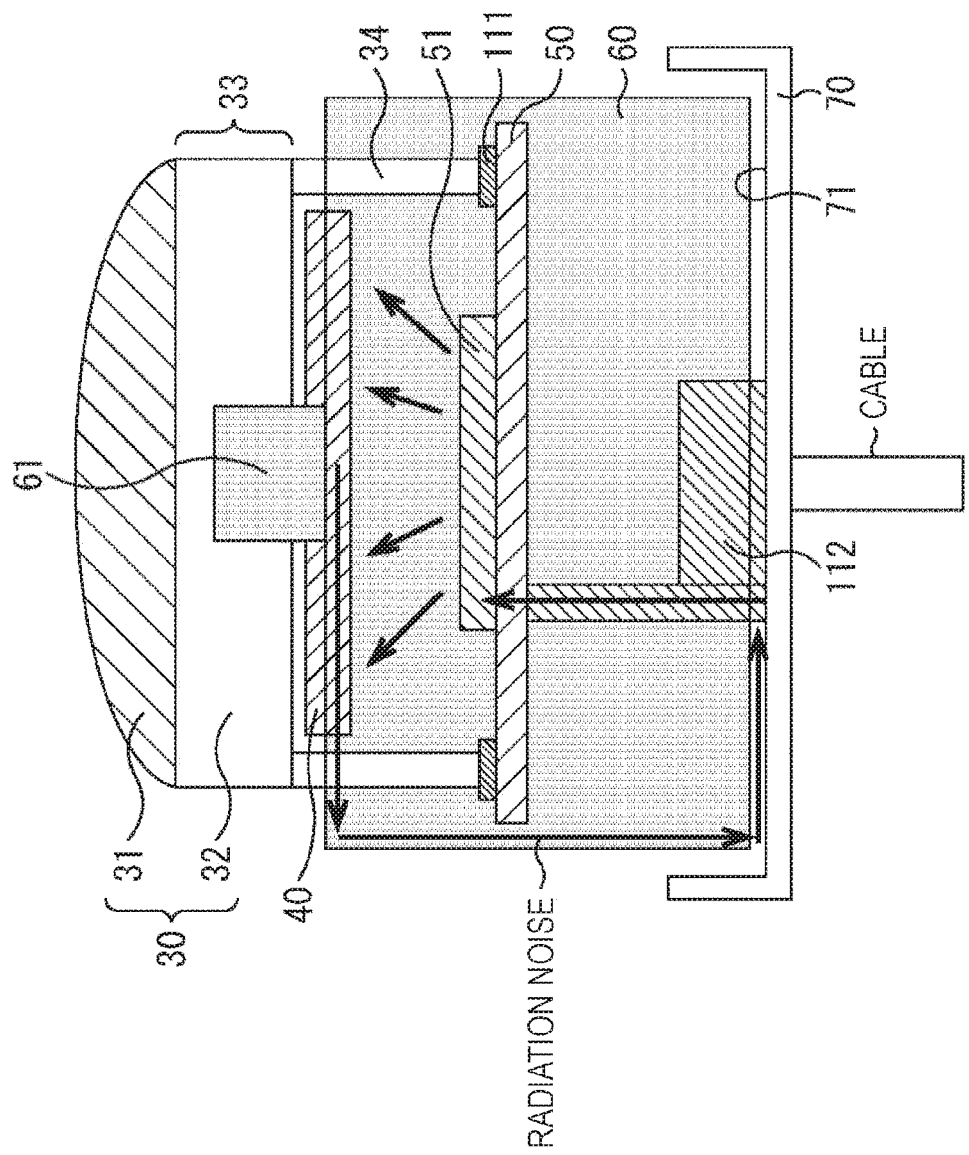
FIG. 13 is a right side view for explaining a path through which the radiation noise of the image sensor 51 propagates in the first exemplary configuration of the camera unit 10.

FIG. 13 is a right side view for explaining a path through which the radiation noise of the image sensor 51 propagates in the first exemplary configuration of the camera unit 10 in FIG. 5.

As described with reference to FIGS. 10 to 12, the radiation noise of the image sensor 51 returns to the image sensor 51 via the lens shield 40, from the upper side to the lower side of the camera shield 60, and the connection portion 112.

Therefore, as illustrated in FIG. 13, a return path of the radiation noise to the image sensor 51 is provided from the image sensor 51, via the lens shield 40, from the upper side to the lower side of the camera shield 60, and the connection portion 112, and returns to the image sensor 51.

In the first exemplary configuration of the camera unit 10 in FIG. 5, since the return path of unnecessary radiation of the camera shield 60 includes the camera shield 60 from the upper side to the lower side, a loop as the return path is lengthened, and the EMC performance is deteriorated.

Therefore, hereinafter, the camera unit 10 having the shortened loop as the return path will be described.

<Second Exemplary Configuration of Camera Unit 10>

Figure 14:
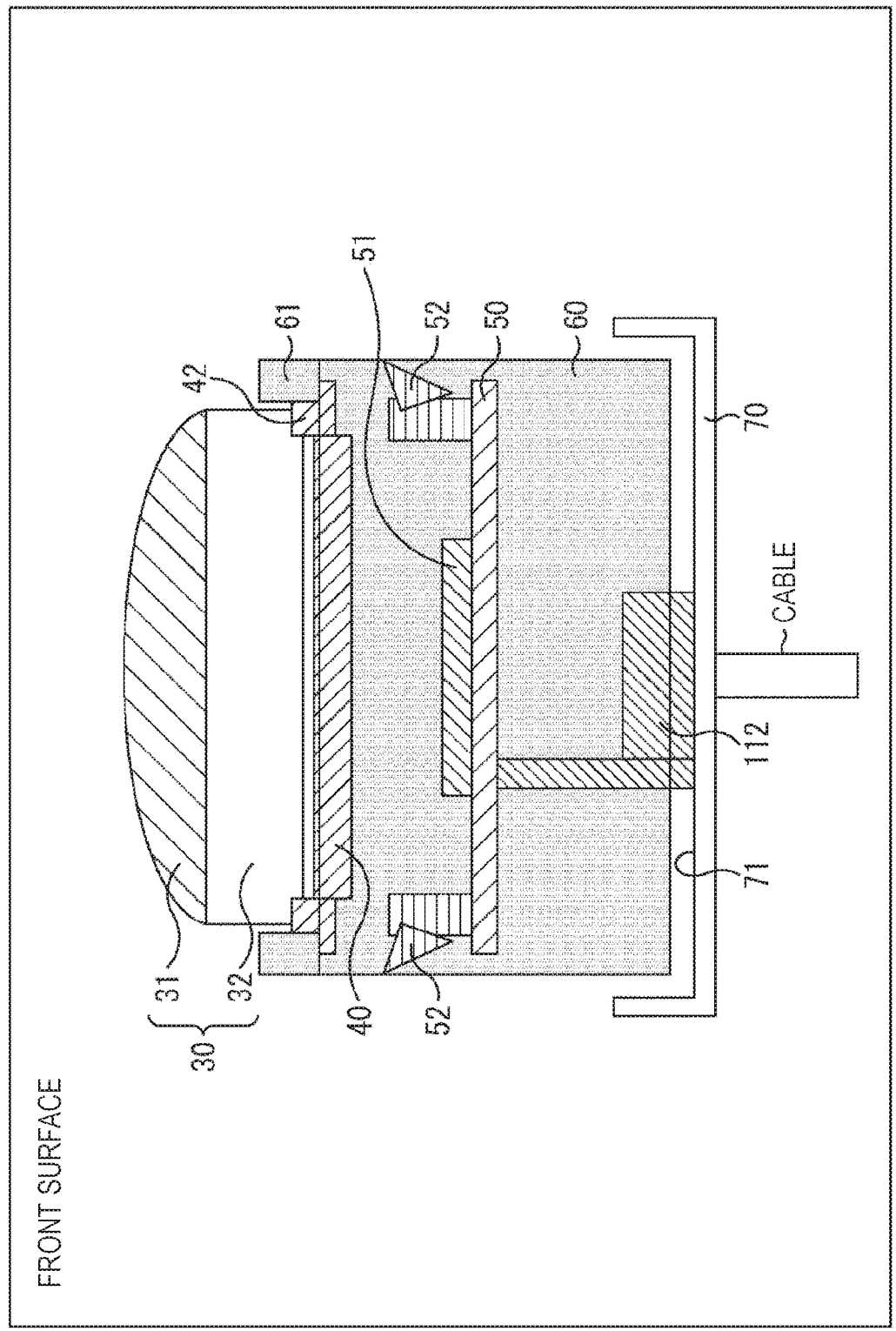
FIG. 14 is a front view of a second exemplary configuration of the camera unit 10 including the lens shield 40 and the camera shield 60.

FIG. 14 is a front view of a second exemplary configuration of the camera unit 10 including the lens shield 40 and the camera shield 60.

Note that, in FIG. 14, a component corresponding to the component in the first exemplary configuration of the camera unit 10 in FIG. 5 and the like is denoted with the same reference numeral, and the description thereof will be appropriately omitted below.

In the second exemplary configuration of the camera unit 10, contact portions 52 that bring the GND reference point of the sensor substrate 50 (and GND of image sensor 51) into contact with a side surface of the camera shield 60 are newly provided on the sensor substrate 50, and this point is different from a case in FIG. 5.

In FIG. 14, the contact portions 52 are provided at ends on the left side surface side and the right side surface side of the sensor substrate 50. Note that the contact portion 52 can be provided on one or more of the front surface side, the back surface side, the left side surface side, and the right side surface side of the sensor substrate 50.

The contact portion 52 has conductivity, and is provided at the end (peripheral portion) of the sensor substrate 50 so as to electrically connect to the GND reference point of the sensor substrate 50. Moreover, the contact portion 52 is configured so as to have contact with the side surface of the camera shield 60 in a form of biasing the camera shield 60 outward when the camera shield 60 is attached so as to house the sensor substrate 50. In FIG. 14, a portion of the contact portion 52 indicated by a triangle biases the camera shield 60 outward. Therefore, the contact portion 52 is provided on the sensor substrate 50 so as to have contact with a portion of the camera shield 60 on the side surface side of the sensor substrate 50 (side surface of camera shield 60).

As described above, the contact portion 52 provided on the sensor substrate 50 has contact with the side surface of the camera shield 60 so that the GND reference point of the sensor substrate 50 (and GND of image sensor 51) is electrically connected to the camera shield 60.

Here, as described above, as the contact portion 52 that is provided at the end of the sensor substrate 50 and has contact with the side surface of the camera shield 60 in a form of biasing the camera shield 60 outward when the camera shield 60 is attached so as to house the sensor substrate 50, for example, an electrical component referred to as a ground contact can be adopted.

Note that, although FIG. 5 is a right side view, FIG. 14 is a front view. Therefore, in FIG. 14, the legs 34 of the lens holder 32 are not illustrated as in FIG. 5. However, in the second exemplary configuration of the camera unit 10 in FIG. 14, similarly to the first exemplary configuration of the camera unit 10 in FIG. 5, the legs 34 of the lens unit 30 are adhesively bonded to the sensor substrate 50 by the adhesive material 111. Therefore, in the second exemplary configuration of the camera unit 10 in FIG. 14, similarly to the first exemplary configuration of the camera unit 10 in FIG. 5, the positional relationship between the lens unit 30 and the sensor substrate 50 can be easily adjusted.

Figure 15:
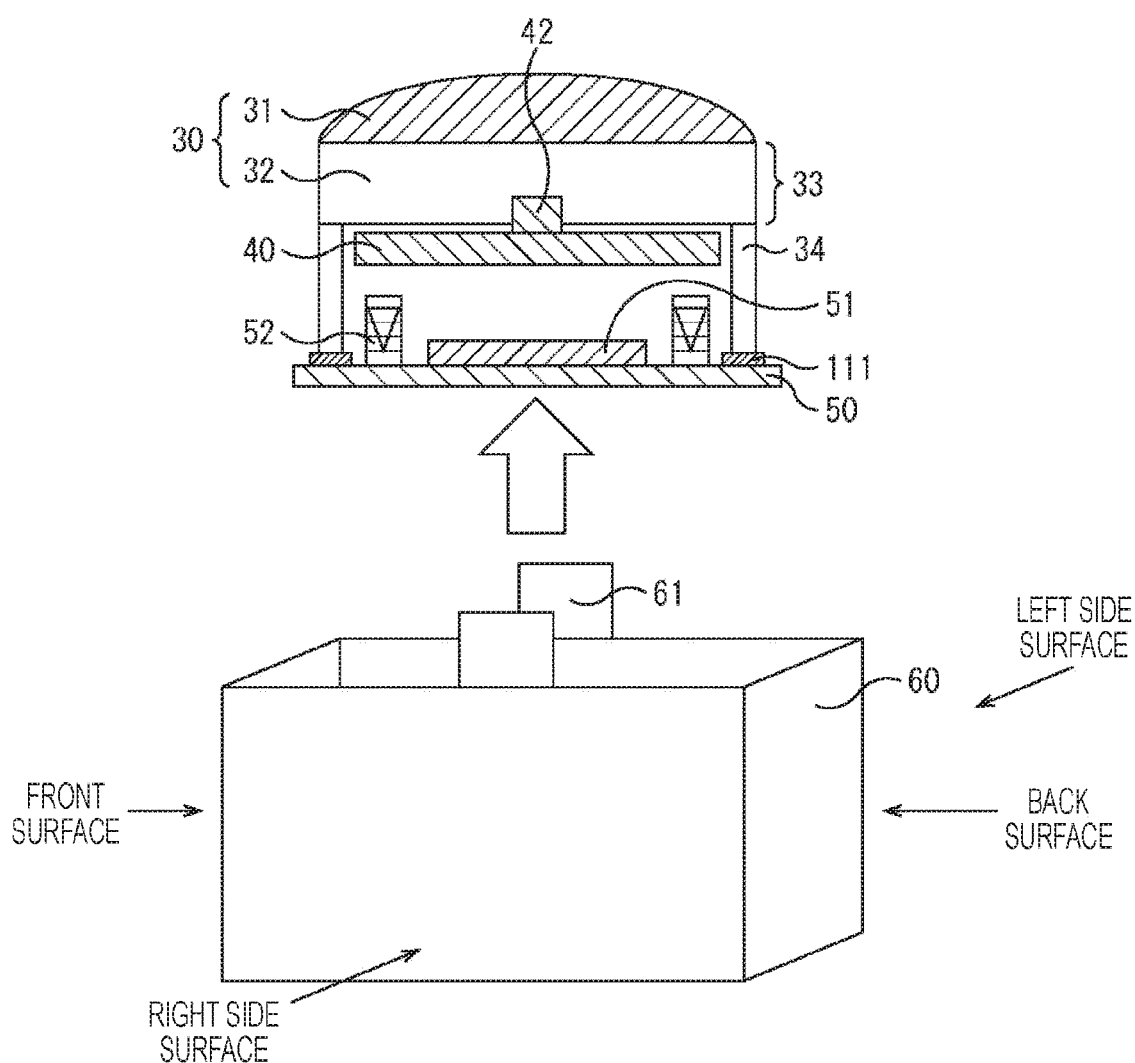
FIG. 15 is a right side view for explaining a method of manufacturing the second exemplary configuration of the camera unit 10.
Figure 16:
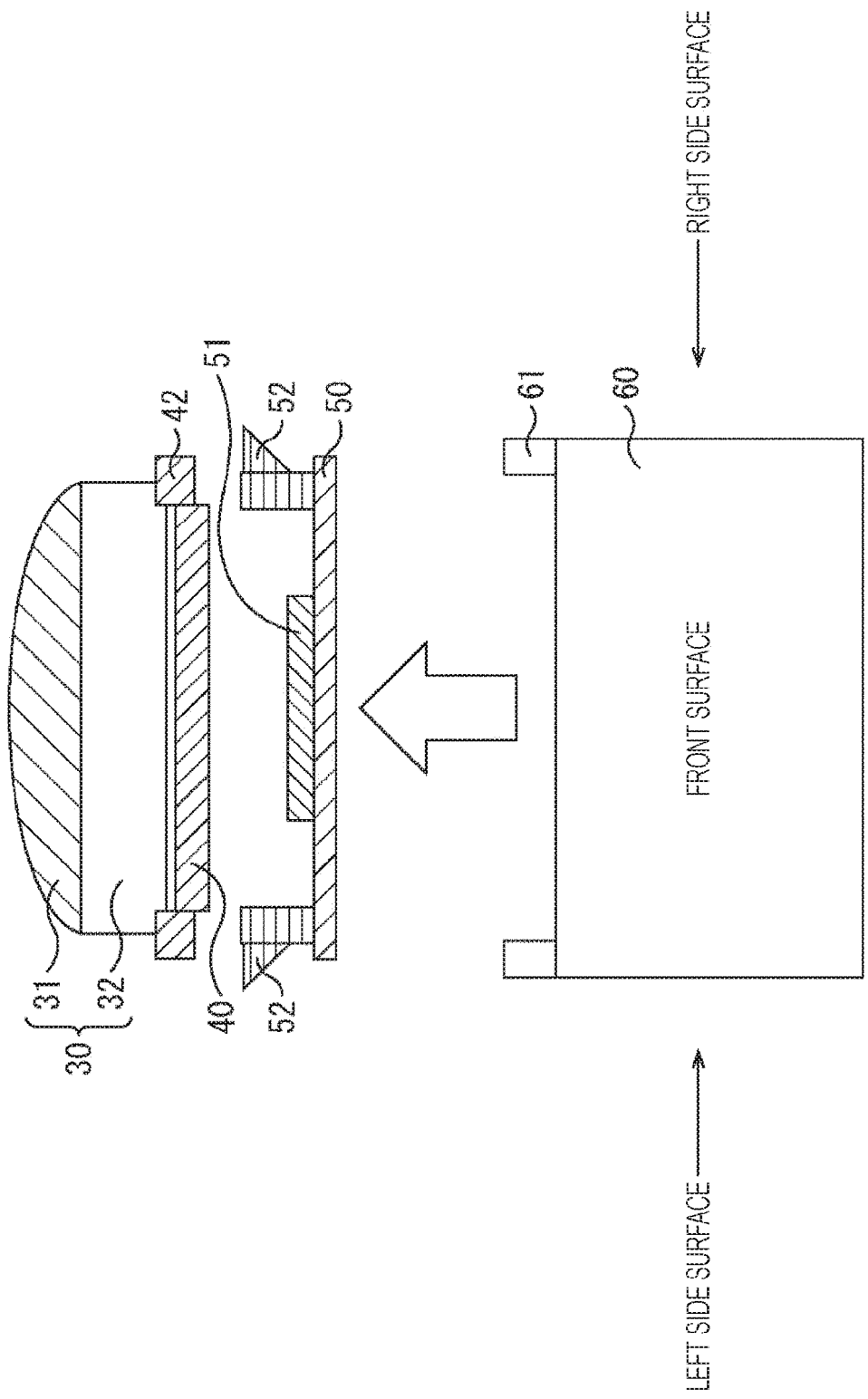
FIG. 16 is a front view for explaining the method of manufacturing the second exemplary configuration of the camera unit 10.

FIG. 15 is a right side view for explaining a method of manufacturing the second exemplary configuration of the camera unit 10 in FIG. 14, and FIGS. 16 and 17 are front views for explaining the method of manufacturing the second exemplary configuration of the camera unit 10 in FIG. 14.

First, as illustrated in FIGS. 15 and 16, the lens shield 40 is fixed to the lens unit 30. In other words, similarly to a case of FIG. 6, the lens shield 40 is fixed to the lens unit 30.

Moreover, similarly to a case of FIG. 6, the adhesive material 111 is applied to one or both of the leg 34 of the lens unit 30 and the sensor substrate 50, and the lens unit 30 is bonded to the sensor substrate 50.

Then, before the lens unit 30 is completely bonded to the sensor substrate 50, the positional relationship between the lens unit 30 and the sensor substrate 50 is adjusted.

Here, in the second exemplary configuration of the camera unit 10 in FIG. 14, as illustrated in FIGS. 15 and 16, the contact portions 52 are provided at positions respectively close to the corners of the sensor substrate 50 on the sides of the left side surface and the right side surface.

The contact portion 52 illustrated in FIG. 14 is a first exemplary configuration of the contact portion 52. The contact portion 52 in FIG. 14 includes a portion indicated by a triangle and a portion indicated by a square and has a structure in which the portion indicated by the triangle can be pushed into the portion indicated by the square. Before the sensor substrate 50 is housed in the camera shield 60, the portion indicated by the triangle of the contact portion 52 is projected to the outside of the sensor substrate 50 as illustrated in FIG. 16.

After the positional relationship between the lens unit 30 and the sensor substrate 50 is adjusted, the camera shield 60 is attached so as to house the sensor substrate 50 after the lens unit 30 is completely bonded to the sensor substrate 50 as illustrated in FIG. 17.

When the camera shield 60 is attached, the contact portion 61 of the camera shield 60 has contact with the fixing portion 42 of the lens shield 40 fixed to the lens unit 30.

Moreover, when the camera shield 60 is attached, the portion indicated by the triangle of the contact portion 52 of the sensor substrate 50 is pushed into the portion indicated by the square of the contact portion 52, a stress (elastic force) generated by the pushing biases the side surface of the camera shield 60 outward. With this movement, the contact portion 52 has contact with the side surface of the camera shield 60.

As described above, the contact portion 52 of the sensor substrate 50 has contact with the side surface of the camera shield 60 so that the contact portion 52 electrically connects between the GND reference point of the sensor substrate 50 and the camera shield 60 with a distance shorter than a case of FIG. 5.

Thereafter, the harness connector 70 is attached, and the cover 20 is further attached although not illustrated. Accordingly, the camera unit 10 is completed.

Figure 18:
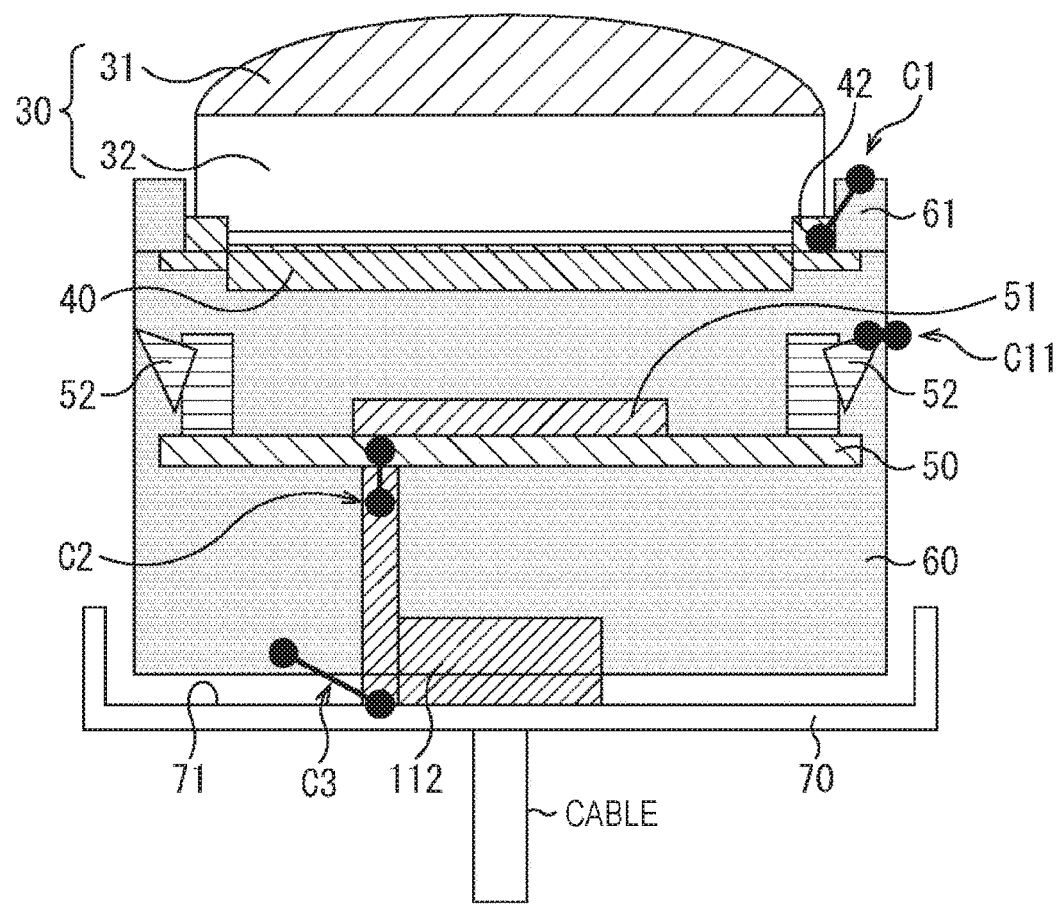
FIG. 18 is a front view for explaining connection of the lens shield 40, a sensor substrate 50, and the camera shield 60 to a GND reference point in the second exemplary configuration of the camera unit 10.

FIG. 18 is a front view for explaining connection of the lens shield 40, the sensor substrate 50, and the camera shield 60 to the GND reference point in the second exemplary configuration of the camera unit 10 in FIG. 14.

In the second exemplary configuration of the camera unit 10 in FIG. 14, similarly to a case of FIG. 9, the lens shield 40 is electrically connected to the camera shield 60 via the contact part C1 between the fixing portion 42 of the lens shield 40 and the contact portion 61 of the camera shield 60.

Moreover, similarly to a case of FIG. 9, the sensor substrate 50 is connected to the harness GND terminal 71 connected to the GND reference point of the vehicle via the contact part C2 between the sensor substrate 50 and the connection portion 112 and the connection portion 112, and the camera shield 60 is connected to the harness GND terminal 71 connected to the GND reference point of the vehicle via the contact part C3 between the camera shield 60 and the harness GND terminal 71.

Then, in the second exemplary configuration of the camera unit 10 in FIG. 14, the sensor substrate 50 is electrically connected to the camera shield 60 via the contact part C11 between the contact portion 52 and the camera shield 60 and the contact portion 52.

Therefore, the lens shield 40, the GND reference point of the sensor substrate 50, and the camera shield 60 are connected to the same GND reference point.

In the camera unit 10, the top surface of the image sensor 51 is covered with the lens shield 40 connected to the GND reference point, and the camera shield 60 connected to the GND reference point covers the surfaces around the image sensor 51 (front surface, back surface, left side surface, and right side surface) and the bottom surface. It is possible to prevent the radiation of the radiation noise of the image sensor 51 to the outside of the camera unit 10.

Figure 19:
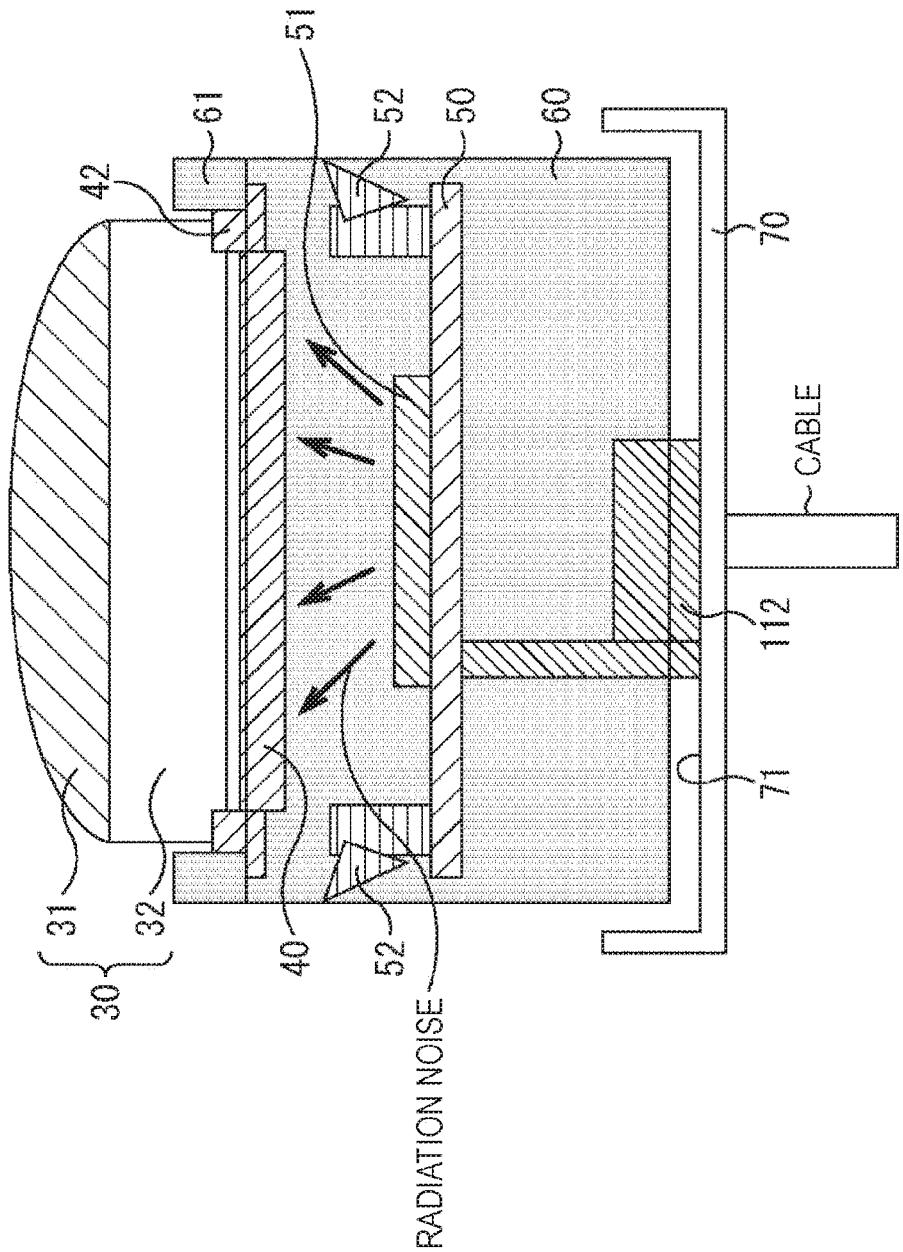
FIG. 19 is a front view for explaining propagation of radiation noise of an image sensor 51 in the second exemplary configuration of the camera unit 10.
Figure 20:
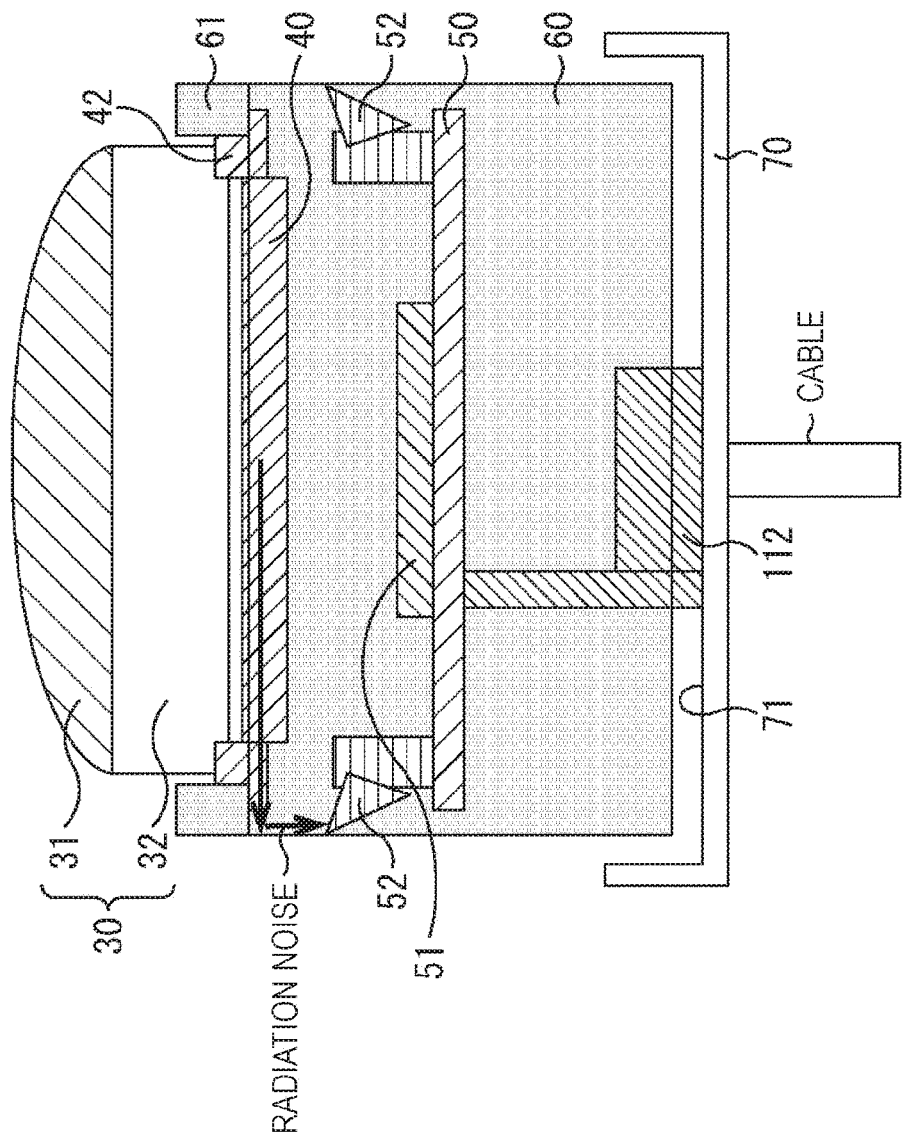
FIG. 20 is a front view for explaining the propagation of the radiation noise of the image sensor 51 in the second exemplary configuration of the camera unit 10.
Figure 21:
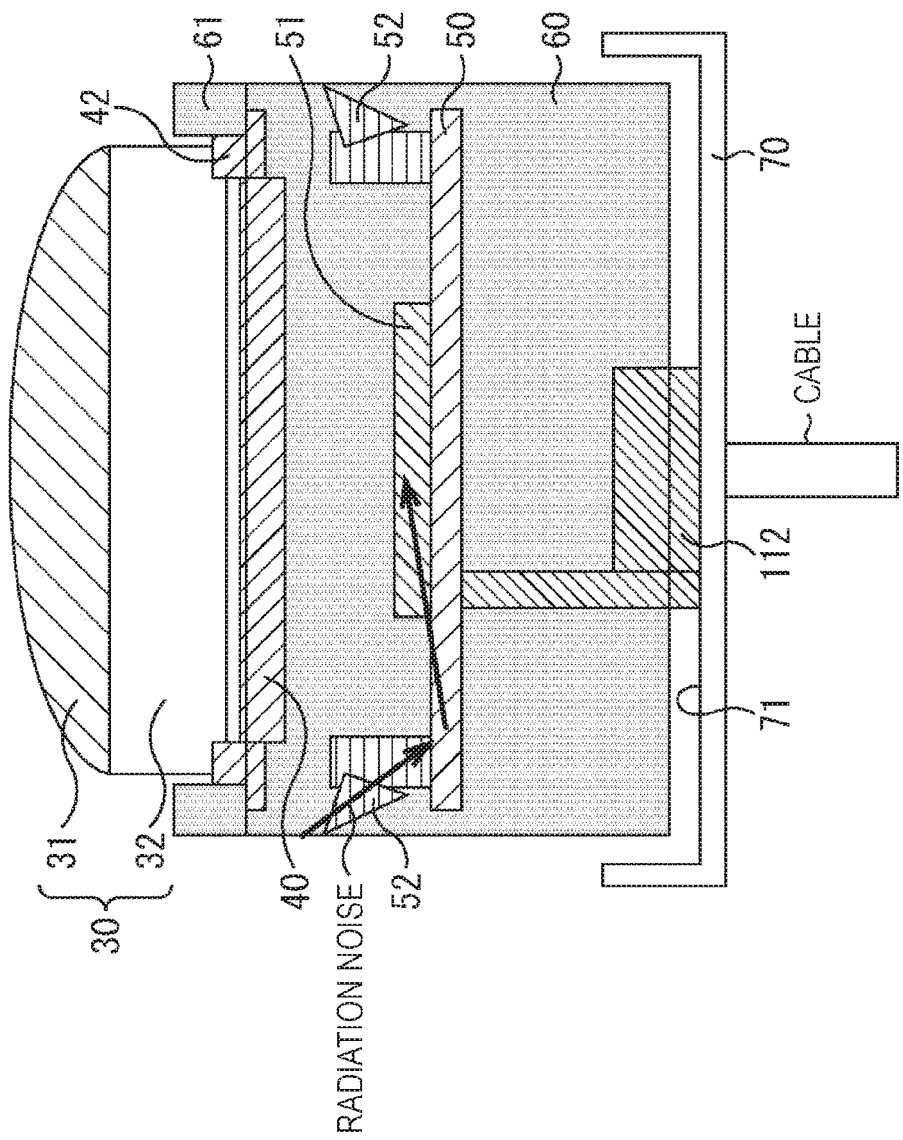
FIG. 21 is a front view for explaining the propagation of the radiation noise of the image sensor 51 in the second exemplary configuration of the camera unit 10.

FIGS. 19, 20, and 21 are front views for explaining propagation of the radiation noise of the image sensor 51 in the second exemplary configuration of the camera unit 10 in FIG. 14.

The radiation noise of the image sensor 51 first propagates to the lens shield 40 as illustrated in FIG. 19. Moreover, as illustrated in FIG. 20, the radiation noise of the image sensor 51 propagates from the lens shield 40 and along the camera shield 60 connected to the lens shield 40 from the upper side to the lower side. Then, as illustrated in FIG. 21, the radiation noise propagates from the camera shield 60 to the contact part between the contact portion 52 and the side surface of the camera shield 60, and the contact portion 52 and returns to the sensor substrate 50 and the image sensor 51 of the sensor substrate 50.

Figure 22:
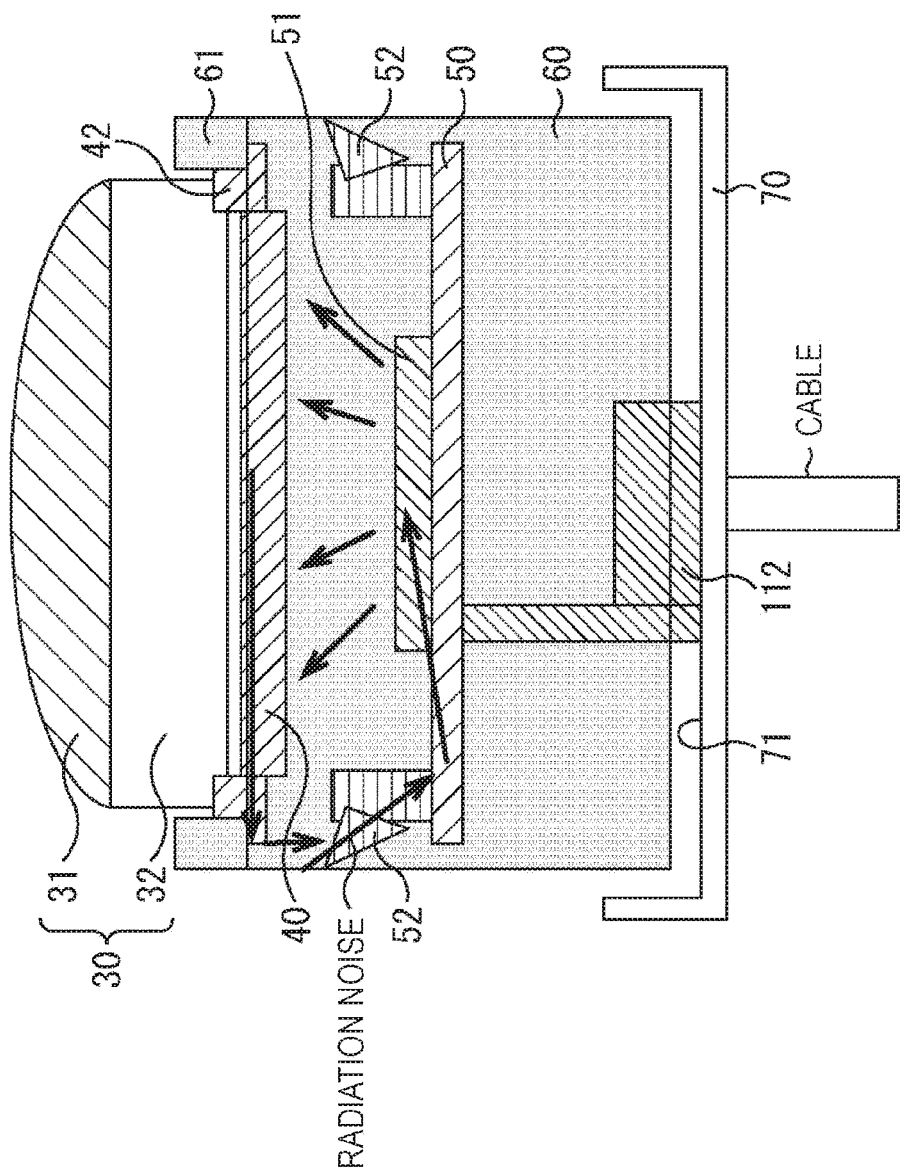
FIG. 22 is a front view for explaining a path through which the radiation noise of the image sensor 51 propagates in the second exemplary configuration of the camera unit 10.

FIG. 22 is a front view for explaining a path through which the radiation noise of the image sensor 51 propagates in the second exemplary configuration of the camera unit 10 in FIG. 14.

As described with reference to FIGS. 19 to 21, the radiation noise of the image sensor 51 returns to the image sensor 51 via the lens shield 40, the upper portion of the camera shield 60, and the contact portion 52.

Therefore, as illustrated in FIG. 22, a return path through which the radiation noise returns to the image sensor 51 is provided from the image sensor 51, via the lens shield 40, the upper portion of the camera shield 60, and the contact portion 52, and returns to the image sensor 51.

In the second exemplary configuration of the camera unit 10 in FIG. 14, the return path includes only the upper portion of the camera shield 60 and does not include the camera shield 60 from the upper side to the lower side as illustrated in FIG. 13. Therefore, the loop as the return path is shorter than that in a case of FIG. 13, in other words, the first exemplary configuration of the camera unit 10 in FIG. 5.

As a result, according to the second exemplary configuration of the camera unit 10 in FIG. 14, the positional relationship between the lens unit 30 and the sensor substrate 50 can be easily adjusted, and the EMC performance can be improved.

By the way, from the viewpoint of improvement in the EMC, the camera shield 60 is configured so as to surround the surfaces around the sensor substrate 50 (front surface, back surface, left side surface, and right side surface) and the bottom surface.

However, in this case, as illustrated in FIG. 17, it is difficult to visually check whether or not the contact portion 52 has contact with the side surface of the camera shield 60 (referred to as contact check) after the camera shield 60 is attached so as to house the sensor substrate 50.

In a case where the contact portion 52 does not have contact with the side surface of the camera shield 60, the return path through which the radiation noise of the image sensor 51 returns to the image sensor 51 in the second exemplary configuration of the camera unit 10 is similar to that in a case of the first exemplary configuration of the camera unit 10 (FIG. 13), and the loop as the return path is lengthened, and the EMC performance is deteriorated.

Therefore, in the camera unit 10, for easy contact check after the attachment of the camera shield 60, it is possible to provide eyeholes, through which the contact between the contact portion 52 and the camera shield 60 can be seen (observed), in the side surface and the bottom surface of the camera shield 60.

<Third Exemplary Configuration of Camera Unit 10>

Figure 23:
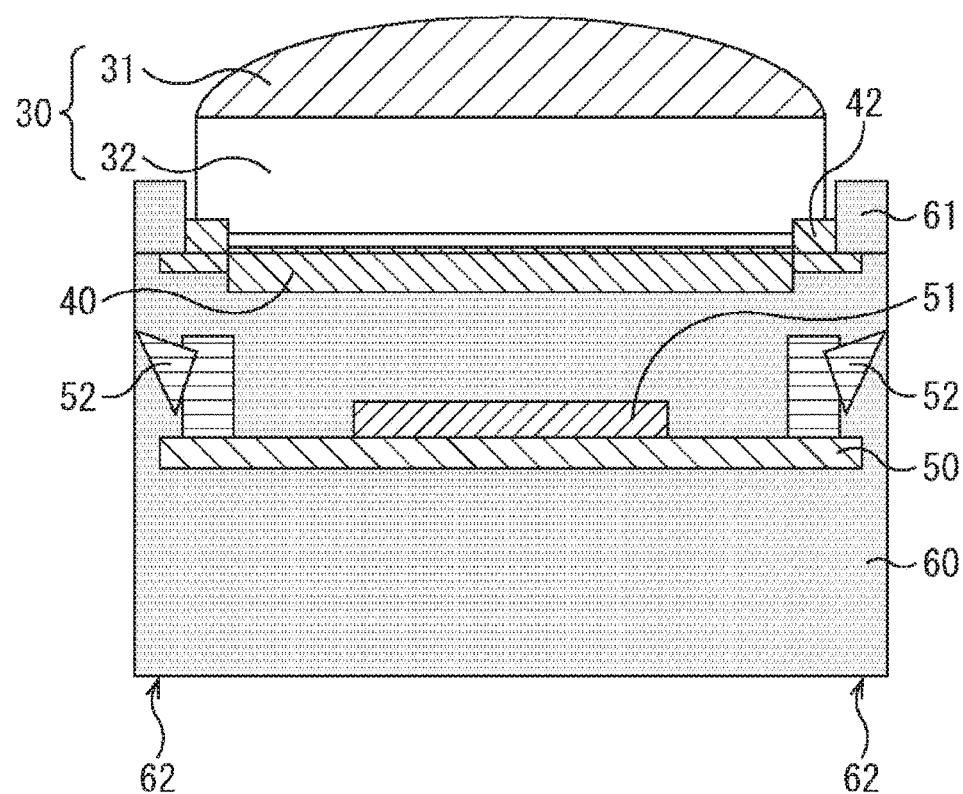
FIG. 23 is a front view of a third exemplary configuration of the camera unit 10 including the lens shield 40 and the camera shield 60.
Figure 24:
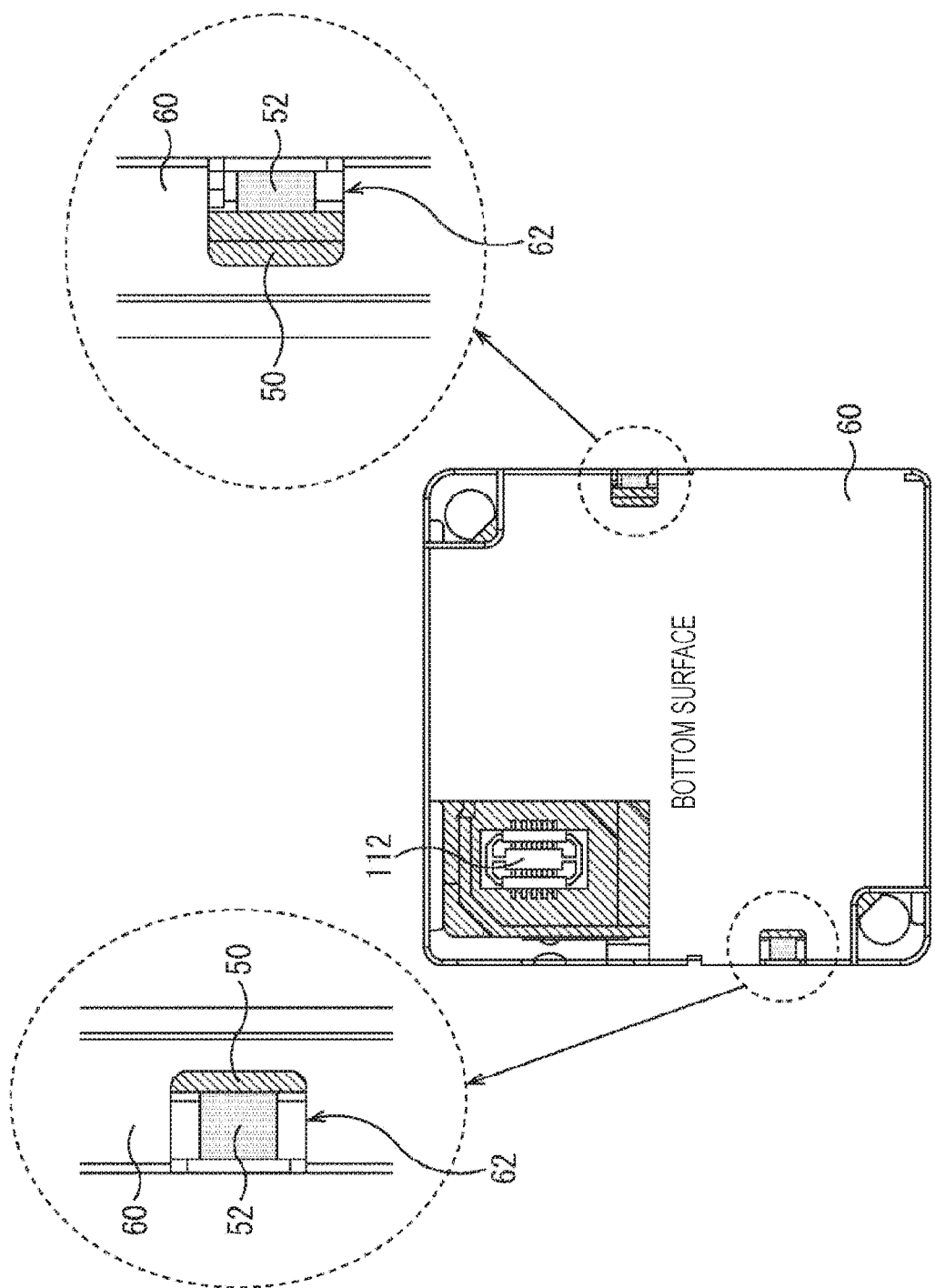
FIG. 24 is a bottom view of the third exemplary configuration of the camera unit 10 including the lens shield 40 and the camera shield 60.

FIG. 23 is a front view of a third exemplary configuration of the camera unit 10 including the lens shield 40 and the camera shield 60, and FIG. 24 is a bottom view of the third exemplary configuration.

Note that, in FIG. 23, a component corresponding to the component in the second exemplary configuration of the camera unit 10 in FIG. 14 is denoted with the same reference numeral, and the description thereof will be appropriately omitted below.

Furthermore, in FIGS. 23 and 24, the camera unit 10 in a state where the harness connector 70 (and cover 20) is not attached is illustrated.

As illustrated in FIGS. 23 and 24, in the third exemplary configuration of the camera unit 10, small holes 62 are provided respectively at positions, facing the contact portions 52, in the bottom surface of the camera shield 60, and this point is different from the second exemplary configuration of the camera unit 10 in FIG. 14.

From the hole 62, the contact state between the contact portion 52 and the camera shield 60 can be seen (observed) in a state where the camera shield 60 is attached so as to house the sensor substrate 50, and accordingly, for example, it is possible to easily check whether or not the contact portion 52 has contact with the camera shield 60 by visually observing the inside of the camera shield 60 or imaging the inside of the camera shield 60 by an inspection camera via the hole 62, and mass productivity can be achieved.

Note that, in the bottom surface of the camera shield 60, an opening is provided at a position facing the connection portion 112 and the like, in addition to the hole 62. The connection portion 112 is electrically connected to the harness GND terminal 71 of the harness connector 70 and the cable connected to the harness connector 70 via the opening provided in the bottom surface of the camera shield 60.

<Other Exemplary Configurations of Contact Portion 52>

Figure 25:
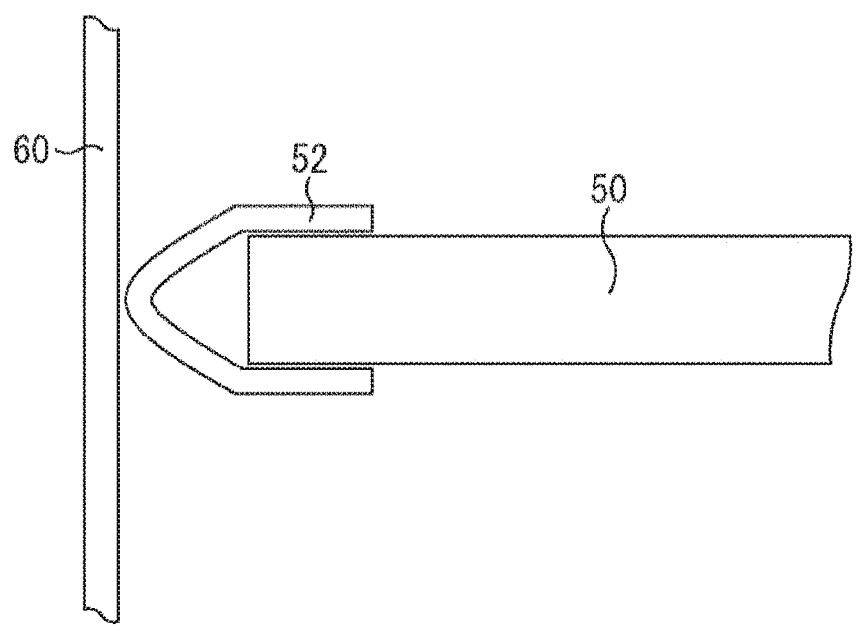
FIG. 25 is a cross-sectional view of another exemplary configuration of a contact portion 52.
Figure 26:
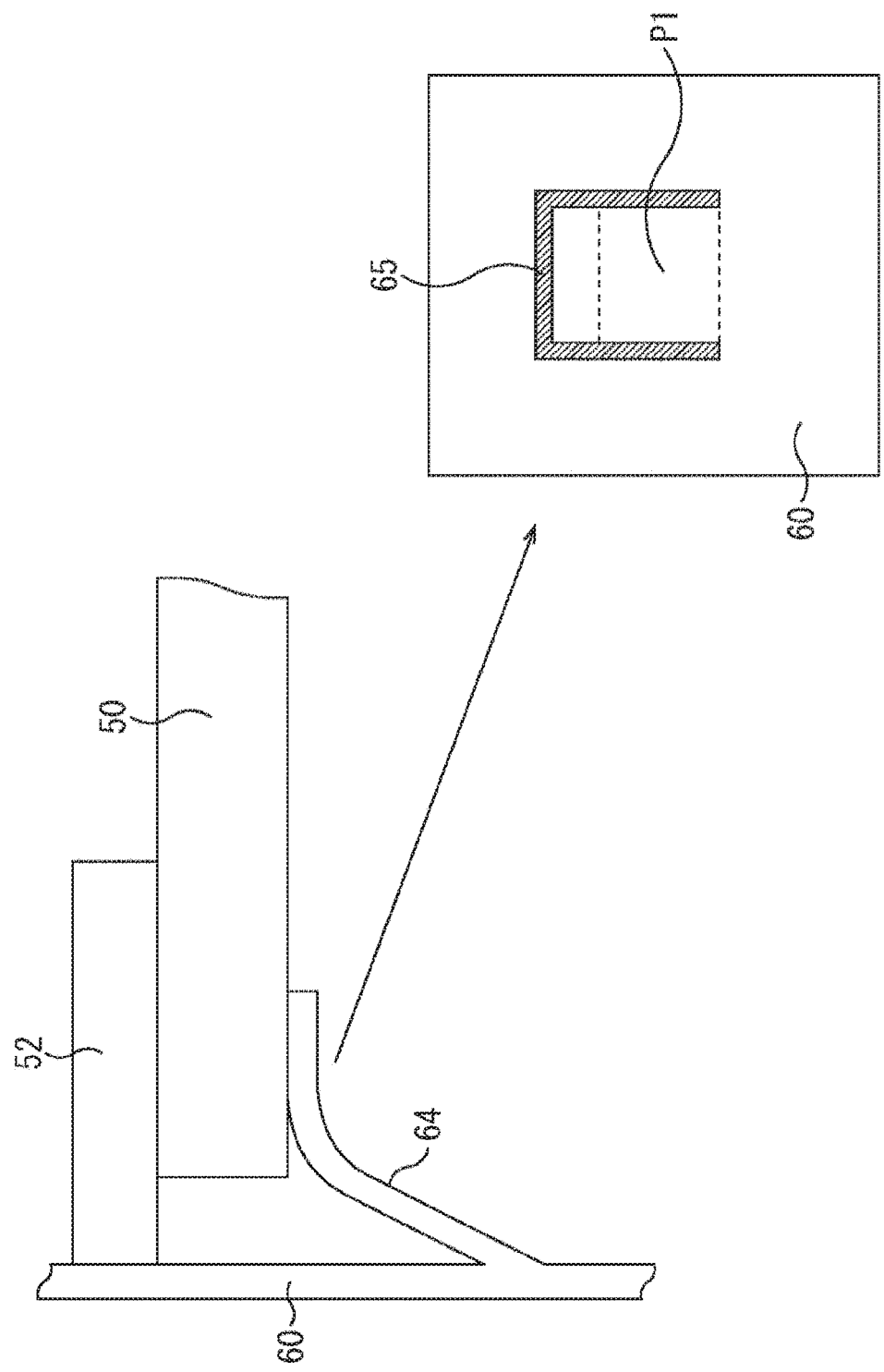
FIG. 26 is a cross-sectional view of still another exemplary configuration of the contact portion 52.
Figure 27:
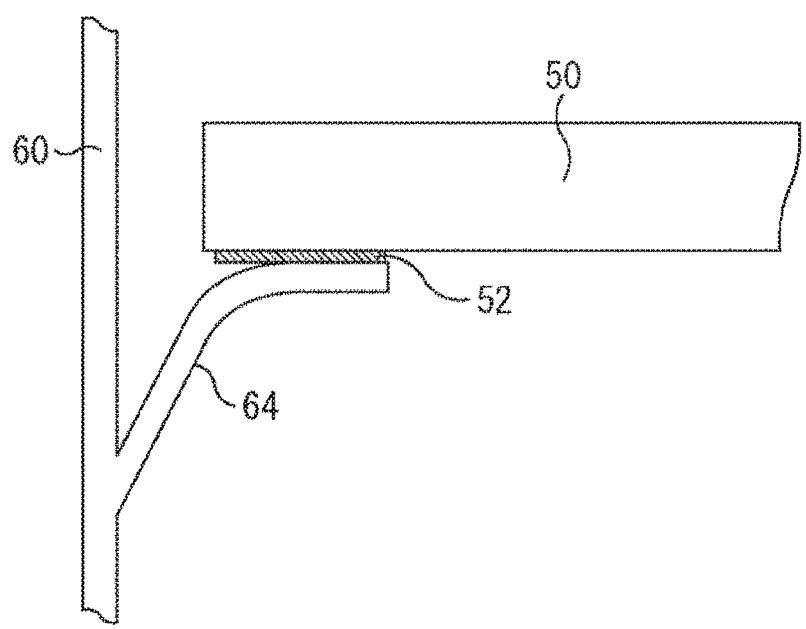
FIG. 27 is a cross-sectional view of yet another exemplary configuration of the contact portion 52.

FIGS. 25, 26, and 27 are cross-sectional views of other exemplary configurations of the contact portion 52.

In each of FIGS. 25 to 27, the contact part between the contact portion 52 and the side surface of the camera shield 60 in a state where the camera shield 60 is attached so as to house the sensor substrate 50 is illustrated.

FIG. 25 is a cross-sectional view of a second exemplary configuration of the contact portion 52.

In FIG. 25, the contact portion 52 includes a metal clip having a substantially U shape. The metal clip as the contact portion 52 is attached to the sensor substrate 50 so as to sandwich the end of the sensor substrate 50 by the U-shaped portion and to be connected to the GND reference point of the sensor substrate 50.

For example, in a state where the metal clips as the contact portions 52 are attached to the sides of the left side surface and the right side surface of the sensor substrate 50, the dimension between the contact portion 52 on the side of the left side surface and the contact portion 52 on the side of the right side surface is slightly larger than the inner dimension between the left side surface and the right side surface of the camera shield 60.

The metal clip as the contact portion 52 sandwiching the sensor substrate 50 is slightly pushed into the side of the sensor substrate 50 when the camera shield 60 is attached so as to house the sensor substrate 50, and the stress generated by the pushing biases the side surface of the camera shield 60 outward, and the metal clip has contact with the side surface of the camera shield 60.

With this structure, the contact portion 52 electrically connects the GND reference point of the sensor substrate 50 to the camera shield 60 in a distance shorter than that in a case of FIG. 5.

FIG. 26 is a cross-sectional view of a third exemplary configuration of the contact portion 52.

In FIG. 26, the contact portion 52 includes a sponge-like conductor (gasket). The sponge-like conductor as the contact portion 52 is attached (fixed) to the sensor substrate 50 so as to slightly extend from the end of the sensor substrate 50 and to be connected to the GND reference point of the sensor substrate 50.

For example, in a state where the sponge-like conductors as the contact portions 52 are attached to the sides of the left side surface and the right side surface of the sensor substrate 50, the dimension between the contact portion 52 on the side of the left side surface and the contact portion 52 on the side of the right side surface is slightly larger than the inner dimension between the left side surface and the right side surface of the camera shield 60.

The sponge-like conductor as the contact portion 52 attached to the sensor substrate 50 is slightly pushed into the side of the sensor substrate 50 when the camera shield 60 is attached so as to house the sensor substrate 50, and the stress generated by the pushing biases the side surface of the camera shield 60 outward, and the sponge-like conductor has contact with the side surface of the camera shield 60.

With this structure, the contact portion 52 electrically connects the GND reference point of the sensor substrate 50 to the camera shield 60 in a distance shorter than that in a case of FIG. 5.

Note that, in FIG. 26, a support portion 64 is formed on the side surface of the camera shield 60. When the camera shield 60 is attached so as to house the sensor substrate 50, the support portion 64 supports the sensor substrate 50 from the side of the bottom surface of the sensor substrate 50.

As illustrated in the plan view of the side surface of the camera shield 60 in the lower right area of FIG. 26, the support portion 64 can be formed by opening a hole 65 along three sides other than the bottom surface side of the four sides of the square of the camera shield 60 and folding a portion indicated by a dotted line in FIG. 26 in a portion P1 surrounded by the hole 65 to the inner side of the camera shield 60.

FIG. 27 is a cross-sectional view of a fourth exemplary configuration of the contact portion 52.

In FIG. 27, the contact portion 52 includes a land provided on the sensor substrate 50. The land as the contact portion 52 is formed at the end on the side of the bottom surface of the sensor substrate 50 so as to be connected to the GND reference point of the sensor substrate 50.

Moreover, in FIG. 27, the support portion 64 described in FIG. 26 is formed on the side surface of the camera shield 60.

Here, the land as the contact portion 52 of the sensor substrate 50 and the support portion 64 of the camera shield 60 are formed at positions at which the land as the contact portion 52 faces the support portion 64 when the camera shield 60 is attached so as to house the sensor substrate 50.

The land as the contact portion 52 of the sensor substrate 50 has contact with the support portion 64 on the side surface of the camera shield 60 when the camera shield 60 is attached so as to house the sensor substrate 50.

With this structure, the contact portion 52 electrically connects the GND reference point of the sensor substrate 50 to the camera shield 60 in a distance shorter than that in a case of FIG. 5.

<Another Embodiment of Camera Unit to which Present Technology is Applied>

Figure 28:
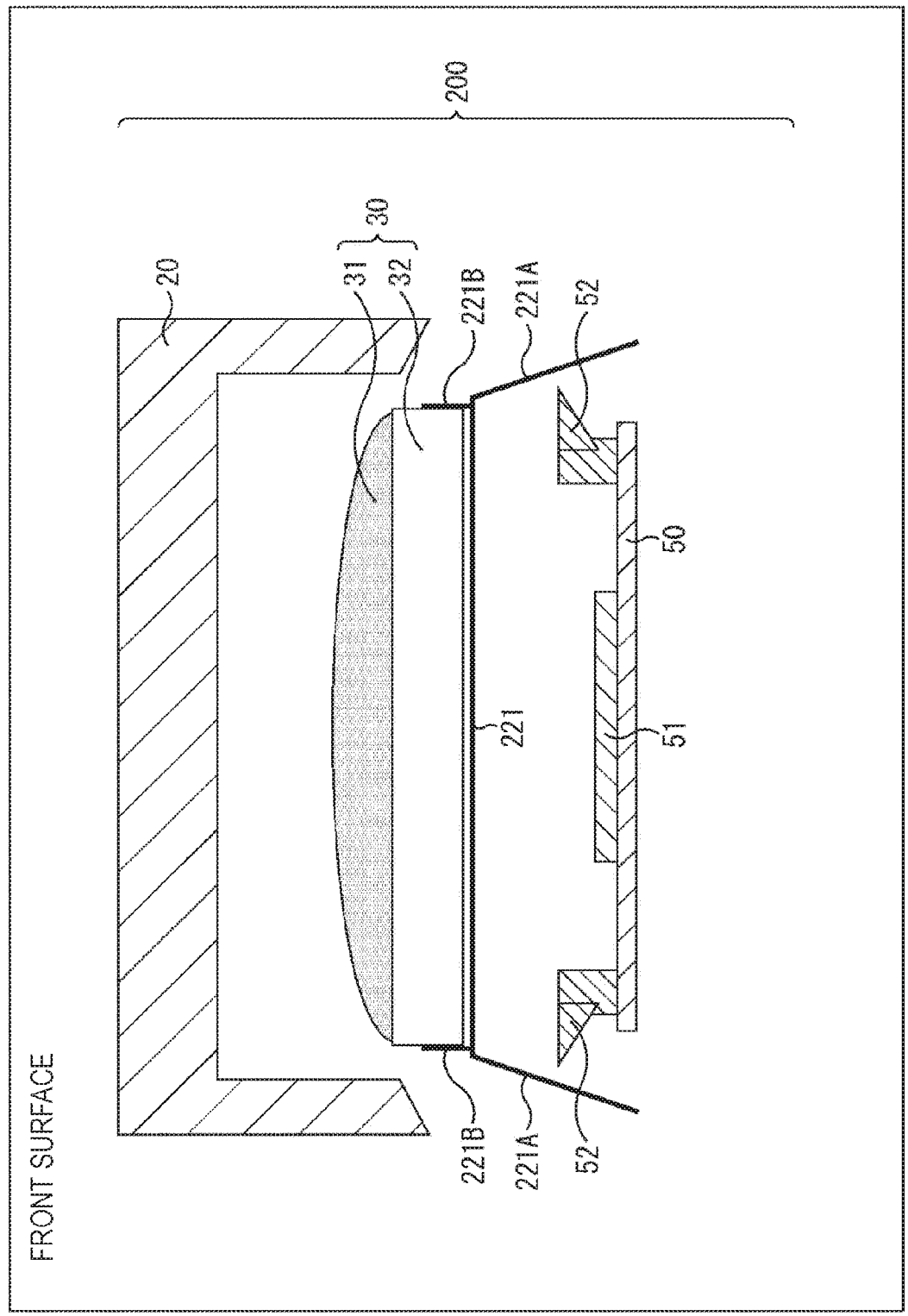
FIG. 28 is a cross-sectional view of an exemplary configuration of another embodiment of the camera unit to which the present technology is applied.

FIG. 28 is a cross-sectional view (as viewed from front side) of an exemplary configuration of another embodiment of a camera unit to which the present technology is applied.

Note that, in FIG. 28, a component corresponding to the component (in the second exemplary configuration) of the camera unit 10 in FIG. 14 is denoted with the same reference numeral, and the description thereof will be appropriately omitted below.

In FIG. 28, a camera unit 200 includes a cover 20, a lens unit 30, a sensor substrate 50, and a front shield case 221.

In the camera unit 200, similarly to a case of the camera unit 10, the lens unit 30 is attached to the sensor substrate 50.

Figure 29:
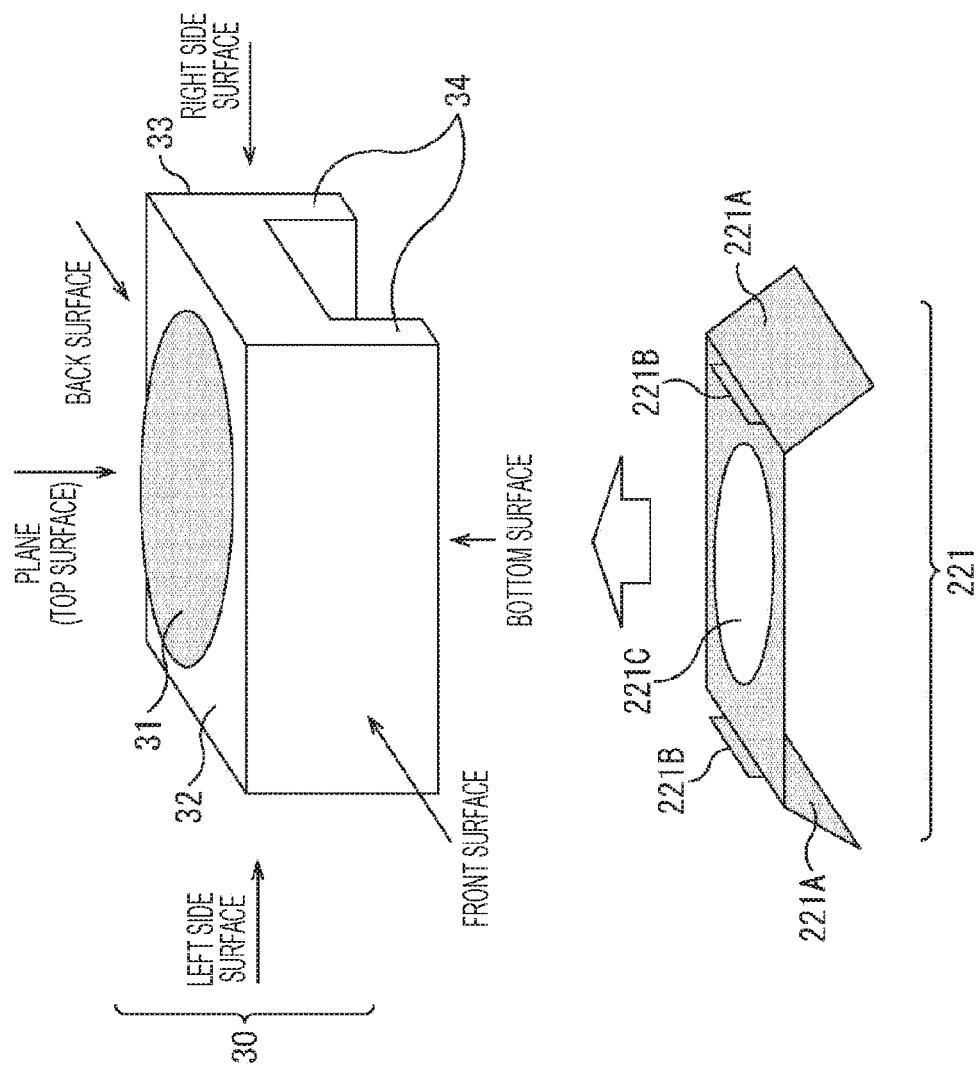
FIG. 29 is a perspective view of an exemplary configuration of a lens unit 30 and a front shield 241 included in a camera unit 200.

FIG. 29 is a perspective view of an exemplary configuration of the lens unit 30 and the front shield case 221 included in the camera unit 200 in FIG. 28.

In FIG. 29, the lens unit 30 is configured as described in FIG. 4.

The front shield case 221 is formed by molding a conductive, for example, metal rectangular plate so that left and right sides of the plate are bent toward the bottom surface. In the front shield case 221, by bending the left and the right sides of the metal rectangular plate, left and right portions that are bent are formed as flaps 221A.

At the left and right ends of the top surface of the front shield case 221, for example, fixing portions 221B that are configured similarly to the fixing portion 42 (FIGS. 6 and 8) are formed. Similarly to the lens shield 40, the front shield case 221 is fixed to the lens unit 30 by fitting the fixing portions 221B into the lower portion (side of bottom surface) of a lens barrel 33 of the lens unit 30.

Similarly to the opening 41 of the lens shield 40, an opening 221C, through which light from a lens 31 of the lens unit 30 passes toward the image sensor 51, is provided in the top surface of the front shield case 221.

The front shield case 221 configured as described above functions as the lens shield 40 and the camera shield 60 (a part thereof).

The camera unit 200 is manufactured as follows.

In other words, the front shield case 221 is fixed to the lens unit 30 by fitting the fixing portions 221B into the lower portion of the lens barrel 33 of the lens unit 30. A positional relationship between the lens unit 30 and the sensor substrate 50 is adjusted before the lens unit 30 fixed to the front shield case 221 is bonded to the sensor substrate 50 and the lens unit 30 is completely bonded to the sensor substrate 50.

Furthermore, by bonding the lens unit 30 fixed to the front shield case 221 to the sensor substrate 50, the front shield case 221 is arranged on the top surface, the left side surface, and the right side surface of (so as to surround) the sensor substrate 50. Therefore, the front shield case 221 is arranged at least on a side of one side surface of the sensor substrate 50.

After the lens unit 30 is completely bonded to the sensor substrate 50, the cover 20 is attached from the upper side so as to house the lens unit 30, which is fixed to the front shield case 221, in the cover 20.

By pushing the cover 20 in, the side surface of the cover 20 pushes the flap 221A of the front shield case 221 inward to close the flap 221A. By closing the flaps 221A, the contact portions 52 have contact with the left and right side surfaces of the front shield case 221 (portion of front shield case 221 on side of side surface of sensor substrate 50), in other words, the flaps 221A.

Here, by closing the flap 221A, the portion indicated by the triangle of the contact portion 52 is slightly pushed into the portion indicated by the square of the contact portion 52, and the stress (elastic force) generated by the pushing biases the flap 221A outward. With this movement, the contact portion 52 firmly has contact with the flap 221A as the side surface of the front shield case 221 (portion of front shield case 221 on side of side surface of sensor substrate 50).

Figure 30:
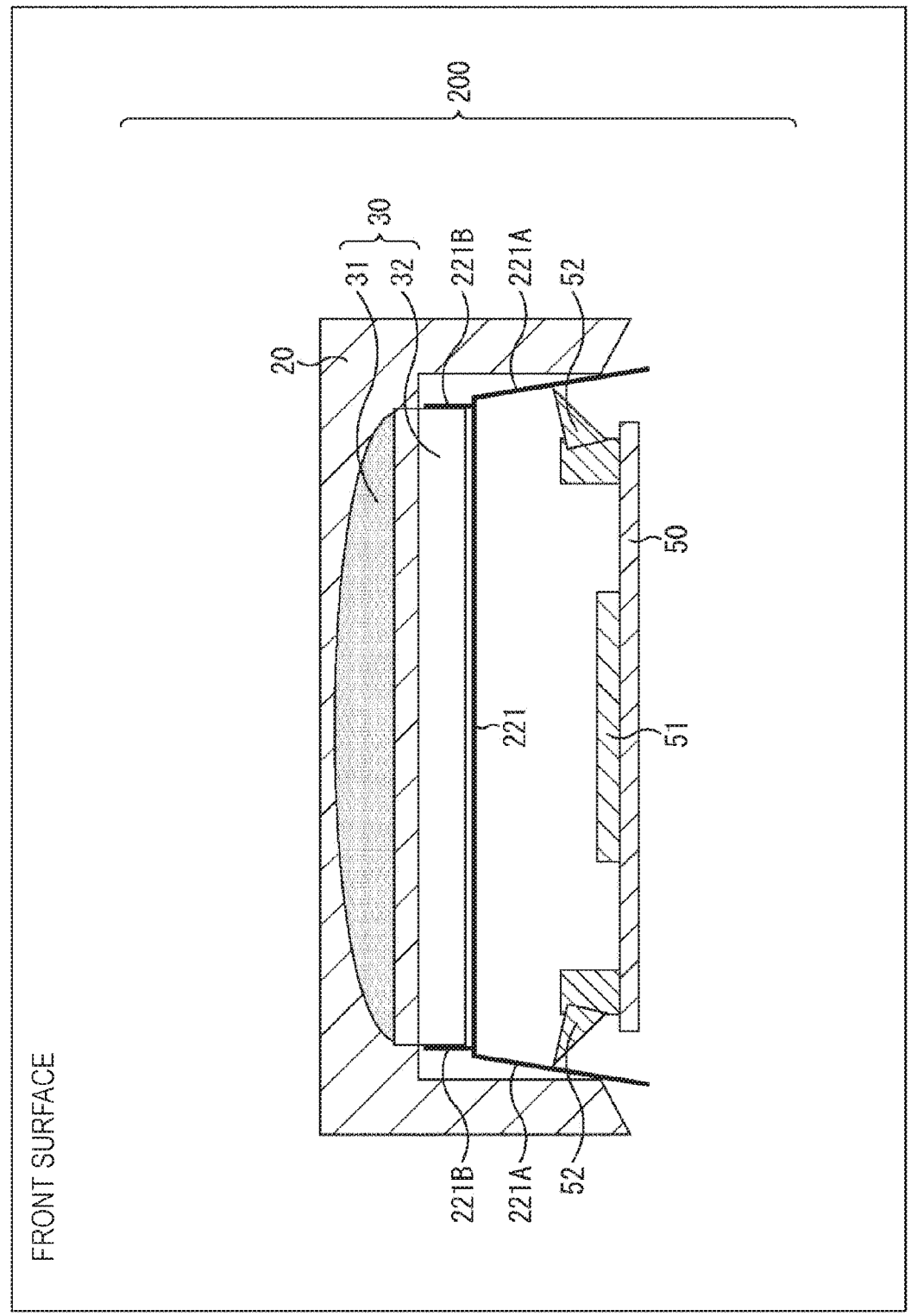
FIG. 30 is a cross-sectional view of the camera unit 200 in a state where a contact portion 52 has contact with a flap 211A.

FIG. 30 is a cross-sectional view (viewed from front side) of the camera unit 200 in a state where the contact portions 52 respectively have contact with the flaps 221A.

In the camera unit 200, the front shield case 221 surrounds the top surface, the left side surface, and the right side surface of the sensor substrate 50. Therefore, radiation of radiation noise of the image sensor 51 of the sensor substrate 50 to the top surface, the left side surface, and the right side surface of the sensor substrate 50 is prevented.

Moreover, in the camera unit 200, the radiation noise of the image sensor 51 returns to the image sensor 51 via the top surface of the front shield case 221, the flap 221A, and the contact portion 52.

Therefore, since a return path of the radiation noise of the image sensor 51 is provided from the image sensor 51, via the top surface of the front shield case 221, the flap 221A, and the contact portion 52, and returns to the image sensor 51, the loop as a return path can be shortened, and the EMC performance can be improved.

Figure 31:
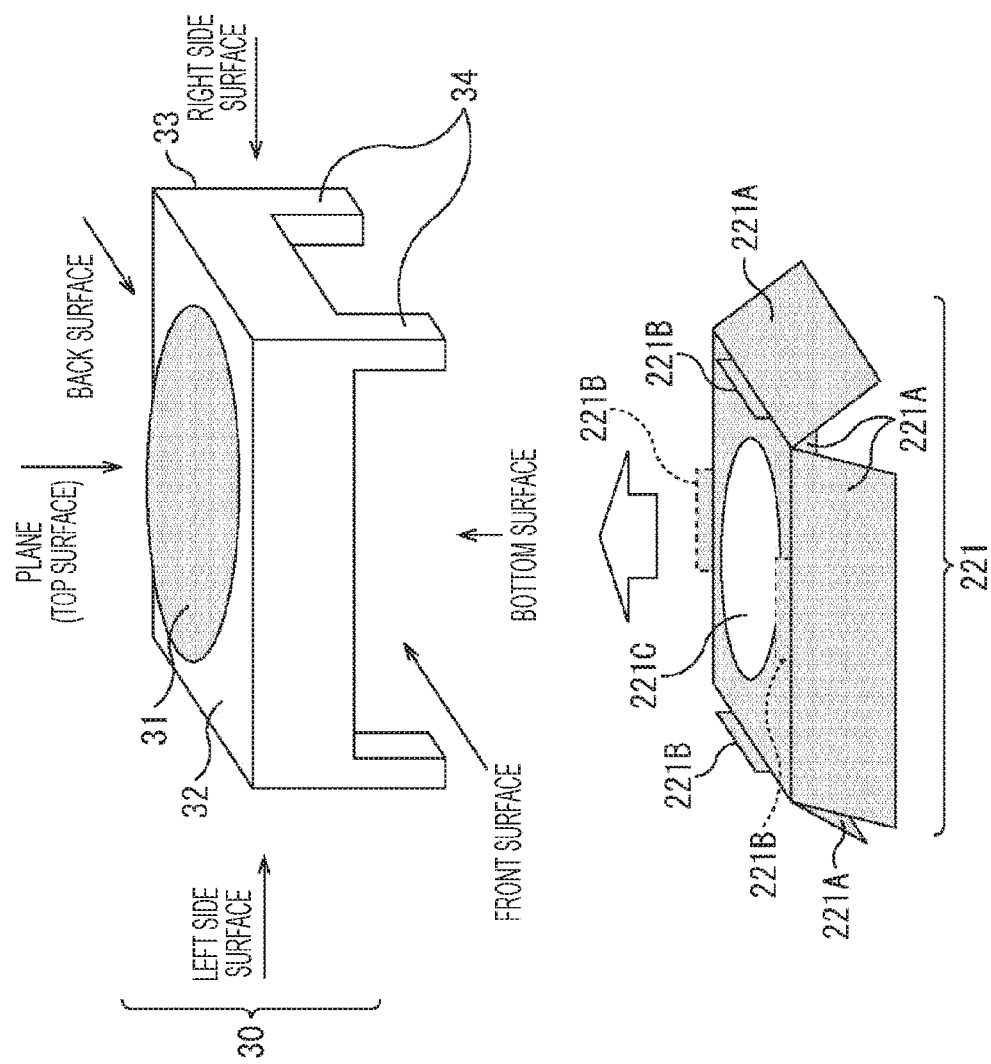
FIG. 31 is a perspective view of another exemplary configuration of the lens unit 30 and the front shield 241 included in the camera unit 200.

FIG. 31 is a perspective view of another exemplary configuration of the lens unit 30 and the front shield case 221 included in the camera unit 200 in FIG. 28.

Note that, in FIG. 31, a component corresponding to that in a case of FIG. 29 is denoted with the same reference numeral, and the description thereof will be appropriately omitted below.

In FIG. 29, legs 34 of a lens holder 32 are formed as walls extending in the horizontal direction on the side of the front surface and the side of the back surface. However, in FIG. 31, the legs 34 of the lens holder 32 are formed in a prismatic column shape at four corners of the lens holder 32.

As described above, in a case where the legs 34 of the lens holder 32 are formed at four corners of the lens holder 32, the front shield case 221 in FIG. 29 can be fixed to the lens unit 30 so that the flaps 221A are arranged on the left side surface and the right side surface of the lens unit 30 (and sensor substrate 50) or can be fixed to the lens unit 30 so that the flaps 221A are arranged on the front surface and the back surface of the lens unit 30.

Moreover, in a case where the legs 34 of the lens holder 32 are formed at four corners of the lens holder 32, the configuration in FIG. 31 can be adopted as the configuration of the front shield case 221 fixed to the lens unit 30.

In other words, the front shield case 221 in FIG. 31 has a configuration in which the flaps 221A are further formed on the front surface and the back surface of the front shield case 221 in FIG. 29.

According to the front shield case 221 in FIG. 31, since the top surface, the front surface, the back surface, the left side surface, and the right side surface of the sensor substrate 50 are surrounded, the radiation of the radiation noise of the image sensor 51 of the sensor substrate 50 to the top surface, the front surface, the back surface, the left side surface, and the right side surface of the sensor substrate 50 is prevented.

Moreover, according to the front shield case 221 in FIG. 31, similarly to a case of FIG. 29, the EMC performance can be improved.

Note that, in the front shield case 221 in FIG. 31, in addition to the left end and the right end of the top surface, as indicated by dotted lines in FIG. 31, the fixing portions 221B are formed on the front end and the back end of the top surface, and the front shield case 221 can be fixed to the lens unit 30 by the four fixing portions 221B on the left, right, front, and back surfaces.

Furthermore, in a case where the front shield case 221 in FIG. 31 is adopted, the contact portions 52 can be provided on the sides of the front surface and the back surface, in addition to the sides of the left side surface and the right side surface of the sensor substrate 50.

<Still Another Embodiment of Camera Unit to which the Present Technology is Applied>

Figure 32:
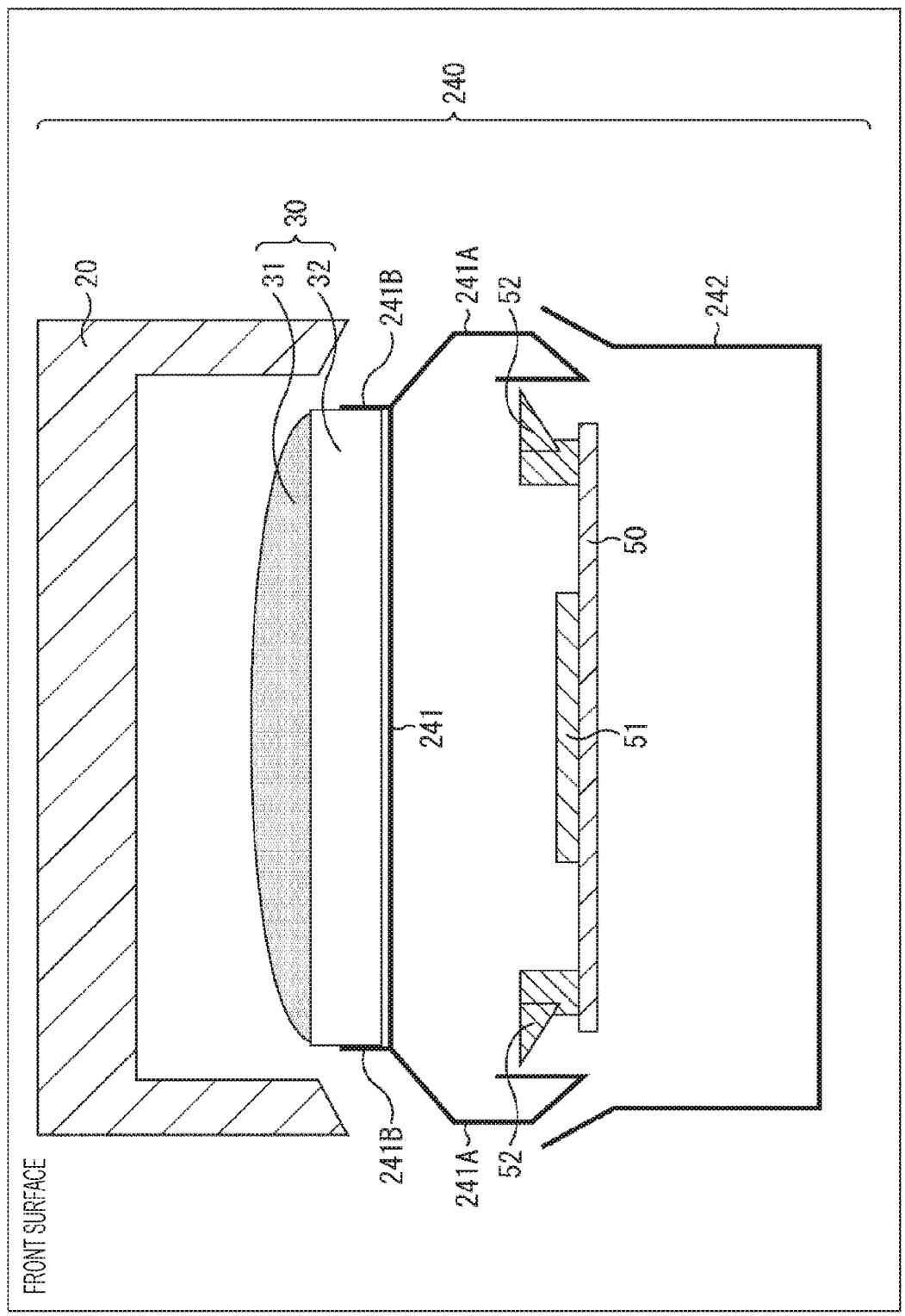
FIG. 32 is a cross-sectional view of an exemplary configuration of still another embodiment of the camera unit to which the present technology is applied.

FIG. 32 is a cross-sectional view (as viewed from front side) of an exemplary configuration of still another embodiment of the camera unit to which the present technology is applied.

Note that, in FIG. 32, a component corresponding to the components in the camera unit 10 (second exemplary configuration thereof) in FIG. 14 and the camera unit 200 in FIGS. 28 to 30 is denoted with the same reference numeral, and the description thereof will be appropriately omitted below.

In FIG. 32, a camera unit 240 includes a cover 20, a lens unit 30, a sensor substrate 50, a front shield 241, and a rear inner shield 242.

In the camera unit 240, similarly to a case of the camera unit 200, the lens unit 30 is formed, for example, as illustrated in FIG. 29 and is bonded to the sensor substrate 50.

Figure 33:
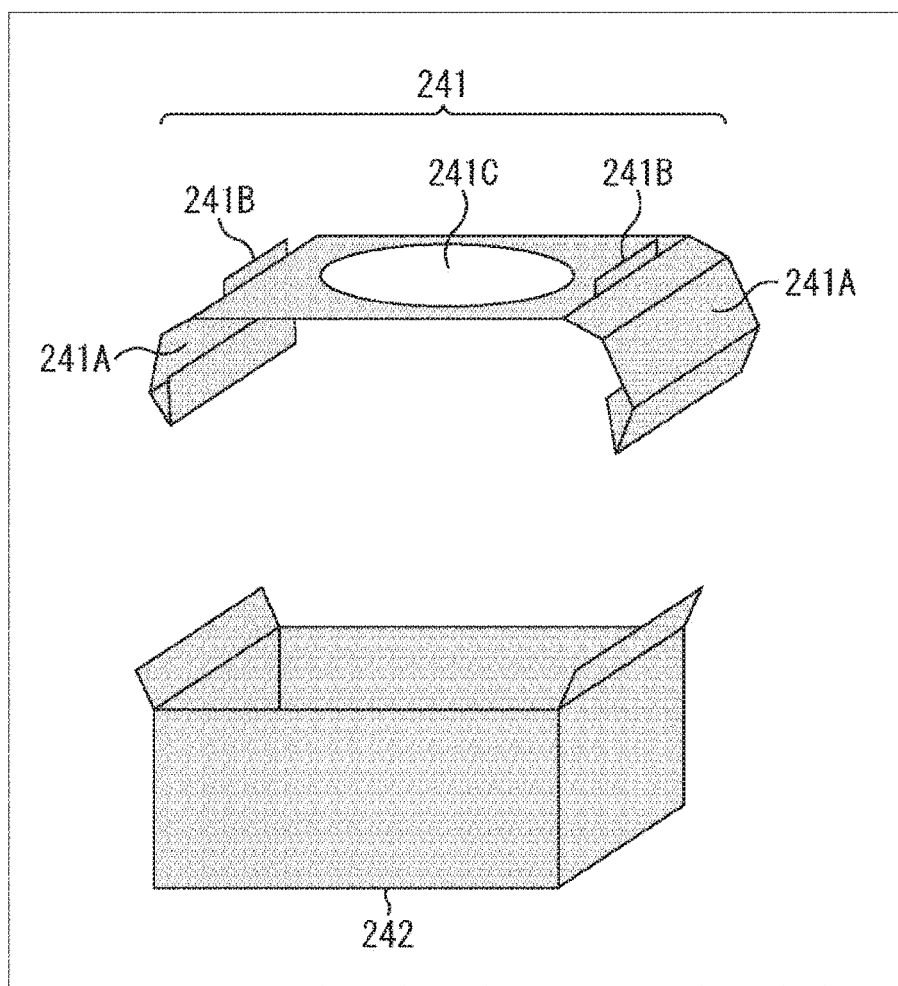
FIG. 33 is a perspective view of an exemplary configuration of a front shield 241 and a rear inner shield 242 included in a camera unit 240.

FIG. 33 is a perspective view of an exemplary configuration of the front shield 241 and the rear inner shield 242 included in the camera unit 240 in FIG. 32.

The front shield 241 is formed by molding a conductive, for example, metal rectangular plate so that left and right sides of the plate are bent toward the bottom surface. In the front shield 241, by bending the left and the right sides of the metal rectangular plate, left and right portions that are bent are formed as flaps 241A. The left and right portions of the front shield 241 as the flaps 241A are creased, and in addition, the end of the flap 241A is folded back to the inner side of the front shield 241.

At left and right ends of the top surface of the front shield 241, for example, fixing portions 241B that are formed similarly to the fixing portion 42 (FIGS. 6 and 8) are formed. Similarly to the lens shield 40, the front shield 241 is fixed to the lens unit 30 by fitting the fixing portions 241B into the lower portion (bottom surface side) of the lens barrel 33 of the lens unit 30.

Similarly to the opening 41 of the lens shield 40, an opening 241C, through which light from a lens 31 of the lens unit 30 passes toward the image sensor 51, is provided in the top surface of the front shield 241.

The front shield 241 configured as described above functions as the lens shield 40 and the camera shield 60 (a part thereof).

The rear inner shield 242 is formed by, for example, molding a conductive metal plate into a prismatic column of which a top surface and a bottom surface are opened.

The width (horizontal width) of the opening in the top surface of the rear inner shield 242 is substantially the same as the width between the ends of the left and right flaps 241A of the front shield 241.

The opening in the top surface of the rear inner shield 242 has a shape of which the cross sectional shape gets wider as it goes upward so that the flap 241A of the front shield 241 can be easily inserted.

The rear inner shield 242 functions as the camera shield 60 (a part thereof).

The camera unit 240 is manufactured as follows.

In other words, the front shield 241 is fixed to the lens unit 30 by fitting the fixing portions 241B into a lower portion of the lens barrel 33 of the lens unit 30 (FIG. 29). A positional relationship between the lens unit 30 and the sensor substrate 50 is adjusted before the lens unit 30 fixed to the front shield 241 is bonded to the sensor substrate 50 and the lens unit 30 is completely bonded to the sensor substrate 50.

Furthermore, by bonding the lens unit 30 fixed to the front shield 241 to the sensor substrate 50, the front shield 241 is arranged on the top surface, the left side surface, and the right side surface of (so as to surround) the sensor substrate 50. Therefore, the front shield 241 is arranged at least on a side of one side surface of the sensor substrate 50.

After the lens unit 30 is completely bonded to the sensor substrate 50, the rear inner shield 242 is assembled by inserting the flaps 241A of the front shield 241 fixed to the lens unit 30 into the rear inner shield 242.

By assembling the rear inner shield 242, the side surface of the rear inner shield 242 pushes the flaps 241A of the front shield 241 inward so as to close the flaps 241A. By closing the flaps 241A, the contact portions 52 have contact with the left and right side surfaces of the front shield 241 (portion of front shield 241 on side of side surface of sensor substrate 50), in other words, the flaps 241A.

Here, by closing the flap 241A, the portion indicated by the triangle of the contact portion 52 is slightly pushed into the portion indicated by the square of the contact portion 52, and the stress (elastic force) generated by the pushing biases the flap 241A outward. With this movement, the contact portion 52 firmly has contact with the flap 241A as the side surface of the front shield 241 (portion of front shield 241 on side of side surface of sensor substrate 50).

Figure 34:
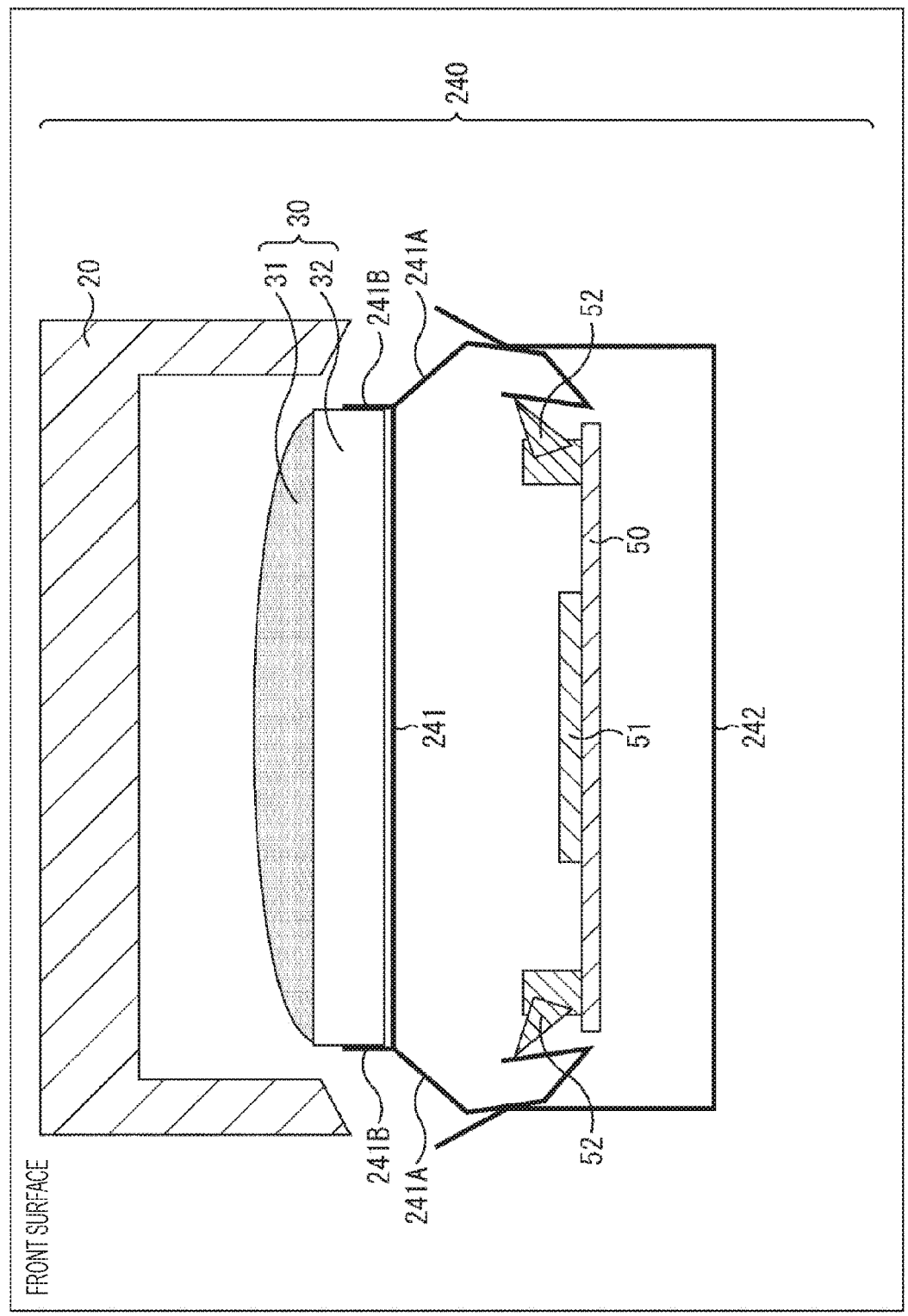
FIG. 34 is a cross-sectional view of the camera unit 240 in a state where a contact portion 52 has contact with a flap 241A.

FIG. 34 is a cross-sectional view (viewed from front side) of the camera unit 240 in a state where the contact portions 52 respectively have contact with the flaps 241A.

In the camera unit 240, the front shield 241 surrounds the top surface, the left side surface, and the right side surface of the sensor substrate 50, and the rear inner shield 242 surrounds the sensor substrate 50, in other words, the front surface, the back surface, the left side surface, and the right side surface. Therefore, the radiation of the radiation noise of the image sensor 51 of the sensor substrate 50 to the top surface and around (front surface, back surface, left side surface, and right side surface) of the sensor substrate 50 is prevented.

Moreover, in the camera unit 240, the radiation noise of the image sensor 51 returns to the image sensor 51 via the top surface of the front shield 241, the flap 241A, and the contact portion 52.

Therefore, since a return path of the radiation noise of the image sensor 51 is provided from the image sensor 51, via the top surface of the front shield 241, the flap 241A, and the contact portion 52, and returns to the image sensor 51, the loop as a return path can be shortened, and the EMC performance can be improved.

Note that, in the camera unit 240, similarly to the camera unit 200, the lens unit 30 can be adopted in which the legs 34 of the lens holder 32 are formed at four corners of the lens holder 32 as illustrated in FIG. 31.

In this case, similarly to the front shield case 221 in FIG. 31, as the front shield 241, a front shield can be adopted in which the flaps 241A are further formed on the front surface and the back surface, in addition to the left side surface and the right side surface.

<Example of Use of Camera Unit 10>

Figure 35:
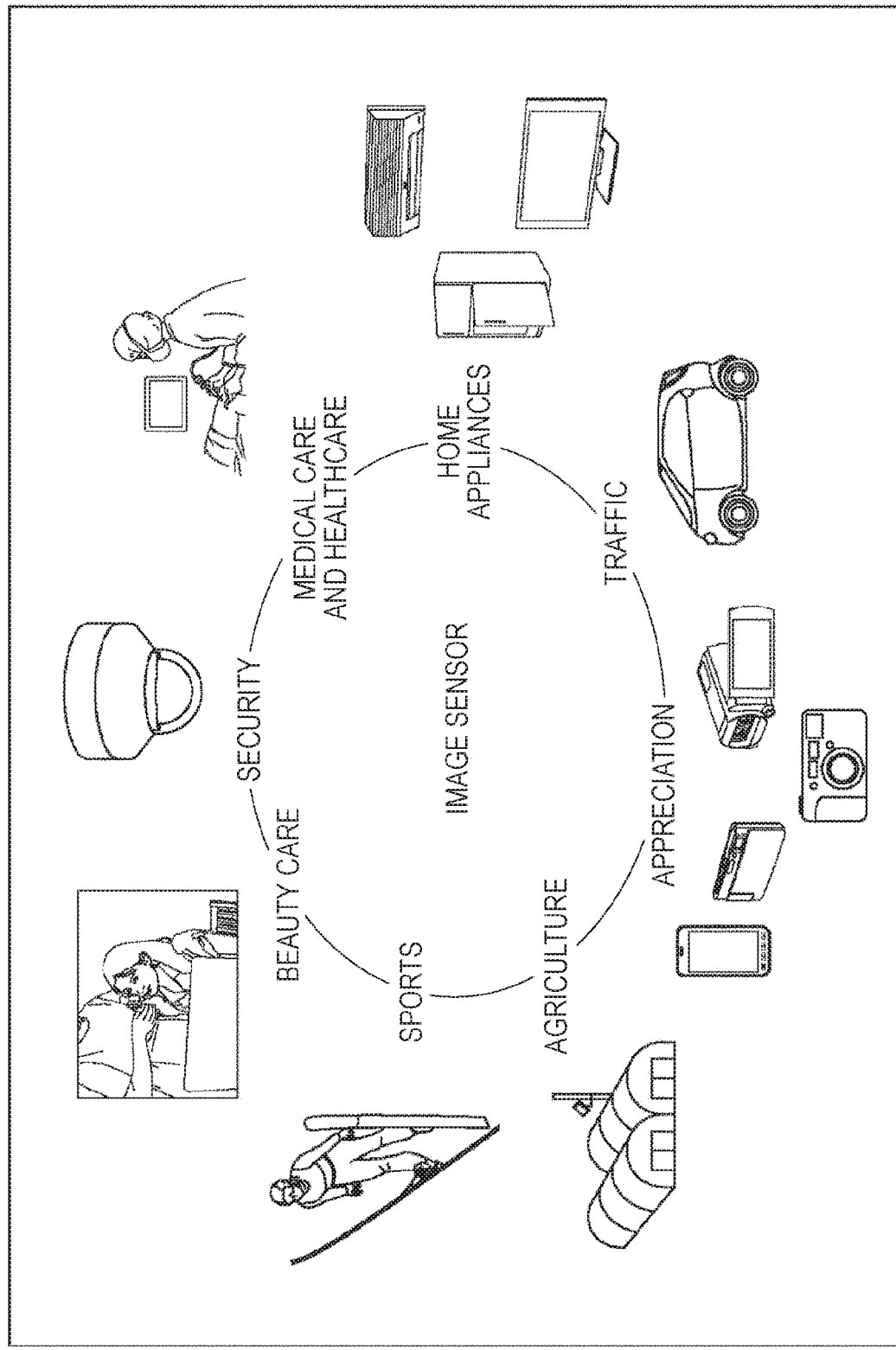
FIG. 35 is a diagram illustrating an example of use of the camera unit 10.

FIG. 35 is a diagram of an example of use of the camera unit 10 in FIG. 1.

The camera unit 10 can be used, for example, in various electronic devices for sensing light such as visible light, infrared light, ultraviolet light, and X-rays as follows.

An electronic device which captures an image to be used for appreciation, such as a digital camera and a portable device with a camera function An electronic device which is used for traffic, such as an in-vehicle sensor for imaging the front, rear, surroundings, inside, and the like of a car for safe driving such as automatic stop, recognition of a driver's state, and the like, a monitoring camera for monitoring a traveling vehicle and a road, a distance measuring sensor for measuring a distance between vehicles, and the like An electronic device which is used for home appliances, such as a TV, a refrigerator, an air conditioner to image a gesture of a user and operate the device according to the gesture An electronic device which is used for medical care and healthcare, such as an endoscope, an electronic microscope, and a device for performing angiography by receiving infrared light An electronic device which is used for security, such as a security monitoring camera and a camera for person authentication An electronic device which is used for beauty care, such as a skin measuring instrument for photographing skin and a microscope for photographing a scalp An electronic device which is used for sports, such as an action camera, a wearable camera for sports, and the like An electronic device which is used for agriculture, such as a camera for monitoring conditions of fields and crops <Application to Mobile Body>

The technology according to the present disclosure (present technology) can be applied to various products. For example, the technology according to the present disclosure may be realized as an apparatus to be mounted on any type of mobile body such as a car, an electric vehicle, a hybrid electric vehicle, a motorcycle, a bicycle, a personal mobility, an airplane, a drone, a ship, and a robot.

Figure 36:
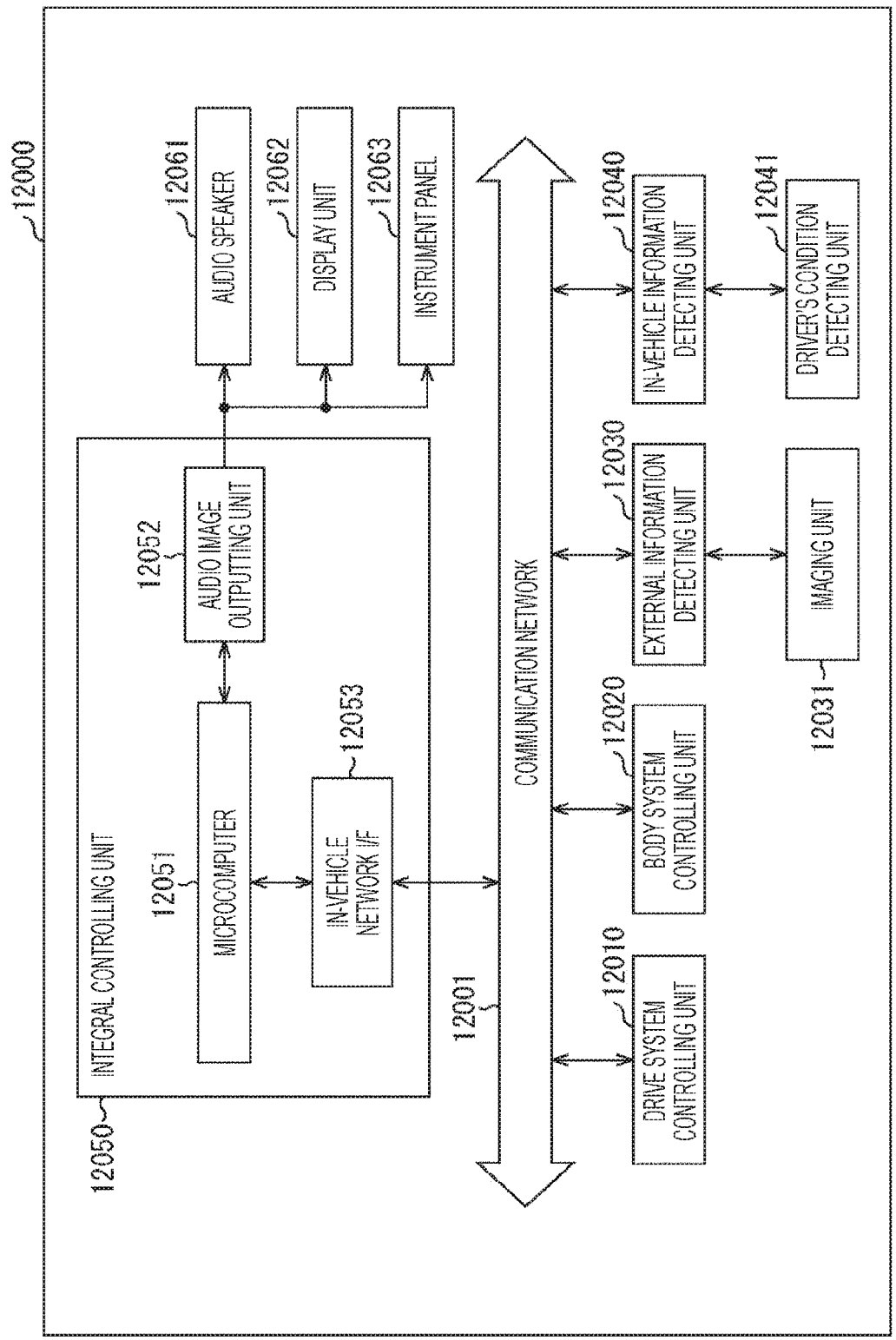
FIG. 36 is a block diagram of an example of a schematic configuration of a vehicle control system.

FIG. 36 is a block diagram of an exemplary schematic configuration of a vehicle control system which is an example of a mobile body control system to which the technology according to the present disclosure may be applied.

A vehicle control system 12000 includes a plurality of electronic control units connected via a communication network 12001. In the example illustrated in FIG. 36, the vehicle control system 12000 includes a drive system controlling unit 12010, a body system controlling unit 12020, an external information detecting unit 12030, an in-vehicle information detecting unit 12040, and an integral controlling unit 12050. Furthermore, as a functional configuration of the integral controlling unit 12050, a microcomputer 12051, an audio image outputting unit 12052, and an in-vehicle network interface (I/F) 12053 are illustrated.

The drive system controlling unit 12010 controls an operation of a device relating to a driving system of the vehicle in accordance with various programs. For example, the drive system controlling unit 12010 functions as a control device of a device such as a driving force generating device to generate a driving force of the vehicle such as an internal combustion engine or a driving motor, a driving force transmitting mechanism to transmit the driving force to wheels, a steering mechanism which adjusts a steering angle of the vehicle, and a braking device which generates a braking force of the vehicle.

The body system controlling unit 12020 controls operations of various devices attached to a vehicle body in accordance with various programs. For example, the body system controlling unit 12020 functions as a control device of a keyless entry system, a smart key system, a power window device, or various lamps such as a headlamp, a back lamp, a brake lamp, a direction indicator, or a fog lamp. In this case, a radio wave transmitted from a portable machine for substituting a key or signals of various switches may be input to the body system controlling unit 12020. The body system controlling unit 12020 receives the input of the radio wave or the signal and controls a door locking device, the power window device, the lamp, and the like of the vehicle.

The external information detecting unit 12030 detects external information of the vehicle including the vehicle control system 12000. For example, the external information detecting unit 12030 is connected to an imaging unit 12031. The external information detecting unit 12030 makes the imaging unit 12031 capture an image outside the vehicle and receives the captured image. The external information detecting unit 12030 may perform processing of detecting an object such as a human, a car, an obstacle, a sign, or letters on the road or distance detection processing on the basis of the received image.

The imaging unit 12031 is an optical sensor that receives light and outputs an electric signal according to an amount of the received light. The imaging unit 12031 can output the electric signal as an image or output the electric signal as information for distance measurement. Furthermore, the light received by the imaging unit 12031 may be visible light or invisible light such as infrared light.

The in-vehicle information detecting unit 12040 detects in-vehicle information. The in-vehicle information detecting unit 12040 is connected to, for example, a driver's condition detecting unit 12041 that detects a condition of a driver. The driver's condition detecting unit 12041 includes, for example, a camera which images the driver. On the basis of the detection information input by the driver's condition detecting unit 12041, the in-vehicle information detecting unit 12040 may calculate a fatigue degree or a concentration degree of the driver and may determine whether the driver falls asleep.

The microcomputer 12051 can calculate a control target value of the driving force generating device, the steering mechanism, or the braking device on the basis of information inside and outside the vehicle obtained by the external information detecting unit 12030 or the in-vehicle information detecting unit 12040 and can output a control instruction to the drive system controlling unit 12010. For example, the microcomputer 12051 can perform cooperative control to realize a function of an Advanced Driver Assistance System (ADAS) including collision avoidance or impact relaxation of the vehicle, a following travel based on a distance between vehicles, a vehicle speed maintaining travel, a vehicle collision warning, a lane deviation warning of the vehicle, or the like.

Furthermore, the microcomputer 12051 controls the driving force generating device, the steering mechanism, the braking device, or the like on the basis of the information regarding the surroundings of the vehicle obtained by the external information detecting unit 12030 or the in-vehicle information detecting unit 12040 so as to perform cooperative control for automatic drive in which the vehicle autonomously travels without depending on an operation by the driver and the like.

Furthermore, the microcomputer 12051 can output the control instruction to the body system controlling unit 12020 on the basis of the information of the outside of the vehicle obtained by the external information detecting unit 12030. For example, the microcomputer 12051 controls headlamps according to a position of a preceding vehicle or an oncoming vehicle detected by the external information detecting unit 12030 so as to perform cooperative control to prevent a glare, for example, switching a high beam to a low beam.

The audio image outputting unit 12052 transmits an output signal which is at least one of a voice or an image to an output device that can visually or auditorily notify information of an occupant of the vehicle or the outside the vehicle. In the example in FIG. 36, an audio speaker 12061, a display unit 12062, and an instrument panel 12063 are exemplified as the output devices. The display unit 12062 may include, for example, at least one of an on-board display or a head-up display.

Figure 37:
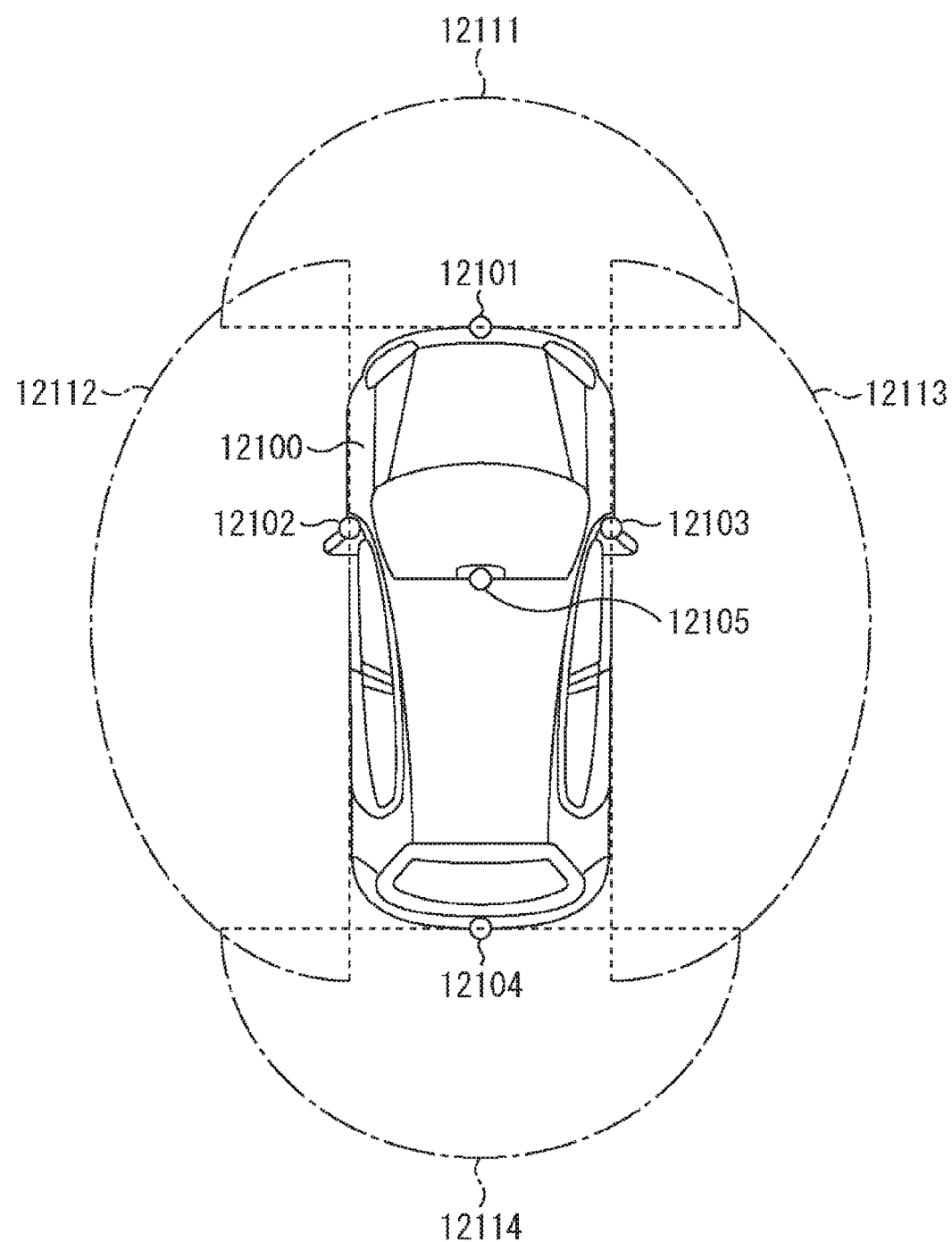
FIG. 37 is an explanatory diagram of exemplary set positions of an external information detecting unit and imaging units.

FIG. 37 is a diagram of exemplary set positions of the imaging units 12031.

In FIG. 37, a vehicle 12100 includes imaging units 12101, 12102, 12103, 12104, and 12105 as an imaging unit 12031.

Each of the imaging units 12101, 12102, 12103, 12104, and 12105 is provided at positions in one of, for example, a front nose, a side mirror, a rear bumper, a back door, an upper side of a windshield in a vehicle interior of a vehicle 12100, and the like. The imaging unit 12101 provided in the front nose and the imaging unit 12105 provided on the upper side of the windshield in the vehicle interior mainly obtain images on front side of the vehicle 12100. The imaging units 12102 and 12103 provided in the side mirrors mainly obtain images on the sides of the vehicle 12100. The imaging unit 12104 provided in the rear bumper or the back door mainly obtains an image on the back side of the vehicle 12100. The image on the front side obtained by the imaging units 12101 and 12105 is mainly used to detect a preceding vehicle, a pedestrian, an obstacle, a traffic signal, a traffic sign, a lane, or the like.

Note that, in FIG. 37, exemplary imaging ranges of the imaging units 12101 to 12104 are illustrated. An imaging range 12111 indicates an imaging range of the imaging unit 12101 provided in the front nose, and imaging ranges 12112 and 12113 respectively indicate imaging ranges of the imaging units 12102 and 12103 provided in the side mirrors. An imaging range 12114 indicates an imaging range of the imaging unit 12104 provided in the rear bumper or the back door. For example, image data imaged by the imaging units 12101 to 12104 is superposed so that a bird's-eye image of the vehicle 12100 viewed from above can be obtained.

At least one of the imaging units 12101 to 12104 may have a function of obtaining distance information. For example, at least one of the imaging units 12101 to 12104 may be a stereo camera including a plurality of imaging elements or may be an imaging element having pixels to detect a phase difference.

For example, by obtaining a distance to solid objects in the respective imaging ranges 12111 to 12114 and a temporal change of the distance (relative speed to vehicle 12100) on the basis of the distance information obtained from the imaging units 12101 to 12104, the microcomputer 12051 can extract a solid object which is positioned on a traveling route of the vehicle 12100 and positioned closest to the vehicle 12100 and travels at a predetermined speed (for example, equal to or more than zero km/h) in a direction substantially the same as the direction in which the vehicle 12100 travels, as a preceding vehicle. Moreover, the microcomputer 12051 can set a distance between the vehicles which should be previously secured between the vehicle and the preceding vehicle and perform automatic brake control (including following travel stop control), automatic acceleration control (including following travel start control), and the like. In this way, the cooperative control can be performed for automatic drive and the like in which the vehicle autonomously travels without depending on the operation by the driver.

For example, on the basis of the distance information obtained from the imaging units 12101 to 12104, the microcomputer 12051 can classify solid object data regarding the solid object into a two-wheeled vehicle, a regular vehicle, a large vehicle, a pedestrian, a utility pole, and other solid object and extract the data so as to use the extracted data to automatically avoid an obstacle. For example, the microcomputer 12051 identifies obstacles around the vehicle 12100 into an obstacle which can be visually recognized by the driver of the vehicle 12100 and an obstacle which is hard to be visually recognized by the driver. Then, the microcomputer 12051 determines a collision risk indicating a danger of risk of the collision with each obstacle. When the collision risk is equal to or higher than a predetermined value and the vehicle may collide the obstacle, the microcomputer 12051 can assist driving to avoid collision by outputting a warning to the driver via the audio speaker 12061 and the display unit 12062 or by forcing deceleration or steering to avoid the obstacle via the drive system controlling unit 12010.

At least one of the imaging units 12101 to 12104 may be an infrared camera for detecting infrared light. For example, the microcomputer 12051 can recognize a pedestrian by determining whether or not the pedestrian exists in the captured images of the imaging units 12101 to 12104. The pedestrian is recognized, for example, by a procedure of extracting feature points in the captured images of the imaging units 12101 to 12104 as the infrared cameras and a procedure of performing pattern matching processing on the series of feature points indicating the shape of the object to determine whether or not the object is a pedestrian. When the microcomputer 12051 determines that the pedestrian exists in the images captured by the imaging units 12101 to 12104 and recognizes the pedestrian, the audio image outputting unit 12052 controls the display unit 12062 to display superimposed rectangular outlines to emphasize the recognized pedestrian. Furthermore, the audio image outputting unit 12052 may control the display unit 12062 to display an icon and the like indicating the pedestrian at a desired position.

An example of the vehicle control system to which the technology according to the present disclosure may be applied has been described above. The technology according to the present disclosure may be applied to the imaging unit 12031 in the above configuration. Specifically, the camera unit 10 in FIG. 1, the camera unit 200 in FIGS. 28 to 31, and the camera unit 240 in FIGS. 32 to 34 can be applied to the imaging unit 12031. By applying the technology according to the present disclosure to the imaging unit 12031, it is possible to meet strict EMC requirements.

Note that the embodiment of the present technology is not limited to the above-mentioned embodiments, and various changes can be made without departing from the scope of the present technology.

Furthermore, the effects described herein are only exemplary and not limited to these. In addition, there may be an additional effect.

Note that, the present technology can have the following configuration.

<1>
A camera unit including:
a shield arranged at least on a side of one side surface of a sensor substrate to which an image sensor is attached; and
a contact portion that has conductivity and is provided on the sensor substrate so as to have contact with a portion on a side of a side surface of the sensor substrate of the shield.

<2>
The camera unit according to <1>, further including:
another shield provided on a side of a top surface of the sensor substrate as assuming a surface of the image sensor where light enters as the top surface.

<3>
The camera unit according to <2>, in which
the another shield has an opening through which light enters the image sensor.

<4>
The camera unit according to any one of <1> to <3>, further including:
a lens unit configured to collect light to the image sensor, in which
the lens unit is fixed to the sensor substrate with adhesive.

<5>
The camera unit according to any one of <1> to <4>, in which
the contact portion has contact with the side surface of the shield in a state where the contact portion biases the side surface of the shield.

<6>
The camera unit according to any one of <1> to <5>, in which
the shield has a hole through which it is possible to see contact between the contact portion and the shield.

<7>
A mobile body including:
a driving system control unit configured to control driving of the mobile body; and
a camera unit, in which
the camera unit includes:
a shield arranged at least on a side of one side surface of a sensor substrate to which an image sensor is attached; and
a contact portion that has conductivity and is provided on the sensor substrate so as to have contact with a portion on a side of a side surface of the sensor substrate of the shield.

REFERENCE SIGNS LIST

10 Camera unit
20 Cover
21 Opening
30 Lens unit
31 Lens
32 Lens holder
33 Lens barrel
34 Leg
40 Lens shield
41 Opening
42 Fixing portion
50 Sensor substrate
51 Image sensor
60 Camera shield
61 Contact portion
62 Hole
64 Support portion
65 Hole
70 Harness connector
71 Harness GND terminal
111 Adhesive material
112 Connection portion
200 Camera unit
231 Front cabinet 240 Camera unit
241 Front shield
241A Flap
241B Fixing portion
241C Opening
242 Rear inner shield

The invention claimed is:

1. A camera unit, comprising:
a sensor substrate;
an image sensor on a specific surface of the sensor substrate;
a first shield on a plurality of sides of the specific surface of the sensor substrate; and
a plurality of contact portions on the specific surface of the sensor substrate, wherein
the plurality of contact portions has conductivity,
a first contact portion of the plurality of contact portions is on a first end of the specific surface of the sensor substrate,
a second contact portion of the plurality of contact portions is on a second end of the specific surface of the sensor substrate,
the first end is opposite to the second end,
the first contact portion is in contact with a first portion of the first shield,
the second contact portion is in contact with a second portion of the first shield, and
the first portion of the first shield is on at least a side of the plurality of sides of the specific surface of the sensor substrate.

2. The camera unit according to claim 1, further comprising a second shield on the specific surface of the sensor substrate, wherein
the second shield is different from the first shield, and
the sensor substrate is configured to receive light on the specific surface.

3. The camera unit according to claim 2, wherein the second shield includes an opening through which the light enters the image sensor.

4. The camera unit according to claim 1, further comprising a lens unit configured to collect light to the image sensor, wherein the lens unit is attachable to the sensor substrate with adhesive.

5. The camera unit according to claim 1, wherein
the plurality of contact portions is configured to bias the first shield, and
the first contact portion of the plurality of contact portions is in contact with the first portion of the first shield based on the bias of the first shield.

6. The camera unit according to claim 1, wherein
the first shield includes a plurality of holes, and
contact state between each contact portion of the plurality of contact portions and the first shield is viewable through a respective hole of the plurality of holes.

7. A mobile body, comprising:
a driving system control unit configured to control driving of the mobile body; and
a camera unit, wherein the camera unit includes:
a sensor substrate;
an image sensor on a specific surface of the sensor substrate;
a shield on a plurality of sides of the specific surface of the sensor substrate; and
a plurality of contact portions on the specific surface of the sensor substrate, wherein
the plurality of contact portions has conductivity,
a first contact portion of the plurality of contact portions is on a first end of the specific surface of the sensor substrate,
a second contact portion of the plurality of contact portions is on a second end of the specific surface of the sensor substrate,
the first end is opposite to the second end,
the first contact portion is in contact with a first portion of the shield,
the second contact portion is in contact with a second portion of the shield, and
the first portion of the shield is on at least a side of the plurality of sides of the specific surface of the sensor substrate.

* * * * *